(12) United States Patent
Kohara et al.

(10) Patent No.: US 8,553,276 B2
(45) Date of Patent: *Oct. 8, 2013

(54) IMAGE READING APPARATUS AND IMAGE FORMING APPARATUS

(75) Inventors: Tasuku Kohara, Kanagawa (JP); Kazuo Koike, Kanagawa (JP); Kenichi Yamada, Kanagawa (JP); Taisuke Omi, Kanagawa (JP); Tsuyoshi Endoh, Kanagawa (JP); Hiroshi Takeda, Chiba (JP); Hiroki Tsuruoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 309 days.

This patent is subject to a terminal disclaimer.

(21) Appl. No.: 13/042,562

(22) Filed: Mar. 8, 2011

(65) Prior Publication Data

US 2011/0228285 A1 Sep. 22, 2011

(30) Foreign Application Priority Data

Mar. 16, 2010 (JP) .................................. 2010-058763

(51) Int. Cl.
*H04N 1/04* (2006.01)
(52) U.S. Cl.
USPC ............. 358/1.2; 358/446; 358/475; 358/482
(58) Field of Classification Search
USPC .................. 358/1.2, 446, 475, 482, 483, 474, 358/514
See application file for complete search history.

(56) References Cited

U.S. PATENT DOCUMENTS

| 7,787,794 B2 | 8/2010 | Yamada et al. |
| 2003/0142208 A1* | 7/2003 | Nakamura ...................... 348/96 |
| 2007/0059032 A1 | 3/2007 | Yamada et al. |

FOREIGN PATENT DOCUMENTS

| JP | 2000-358131 | 12/2000 |
| JP | 2010-114551 | * 5/2010 |

OTHER PUBLICATIONS

U.S. Appl. No. 13/041,825, filed Mar. 7, 2011, Kohara, et al.

* cited by examiner

*Primary Examiner* — Houshang Safaipour
(74) *Attorney, Agent, or Firm* — Oblon, Spivak, McClelland, Maier & Neustadt, L.L.P.

(57) ABSTRACT

An image reading apparatus includes a contact glass having a light control glass part having transmittance changeable by an applied voltage; a scanner part reading an original placed on an original placement surface of the contact glass and outputting image data in a storage part; a projector part projecting image information onto the contact glass from a side opposite to the original placement surface; and a control part controlling the voltage applied to the light controlling glass part. When the scanner part is operated, the control part causes the transmittance of the contact glass to increase and the projector part stops projecting the image information, and when the scanner part is not operated, the control part causes the transmittance of the contact glass to decrease and the projector part projects the image data stored in the storage part onto the contact glass.

19 Claims, 26 Drawing Sheets

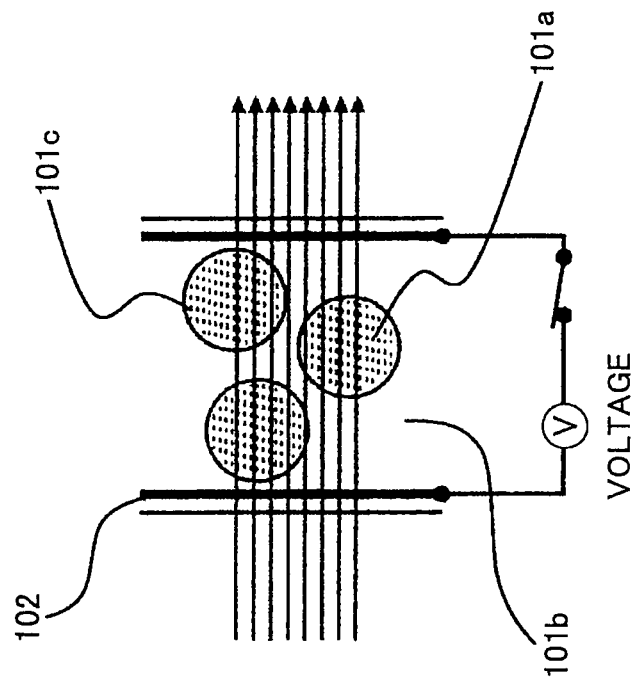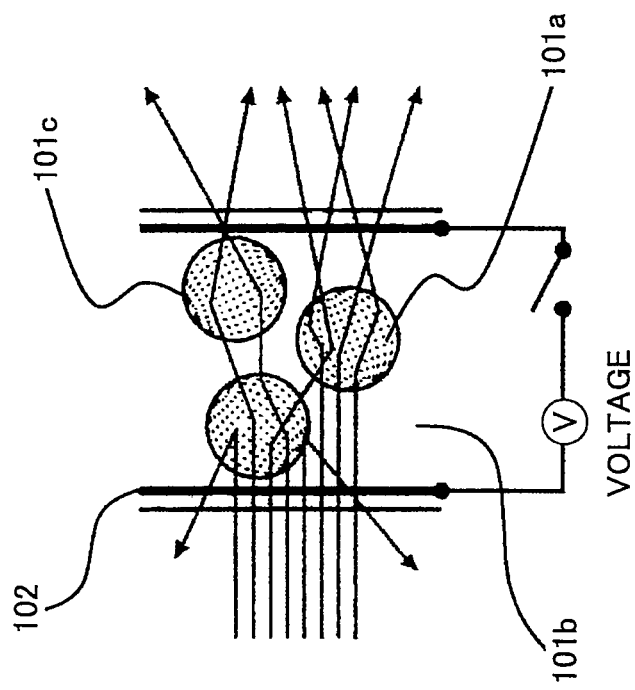

PROJECTED IMAGE

PROJECTED IMAGE

135c

135c

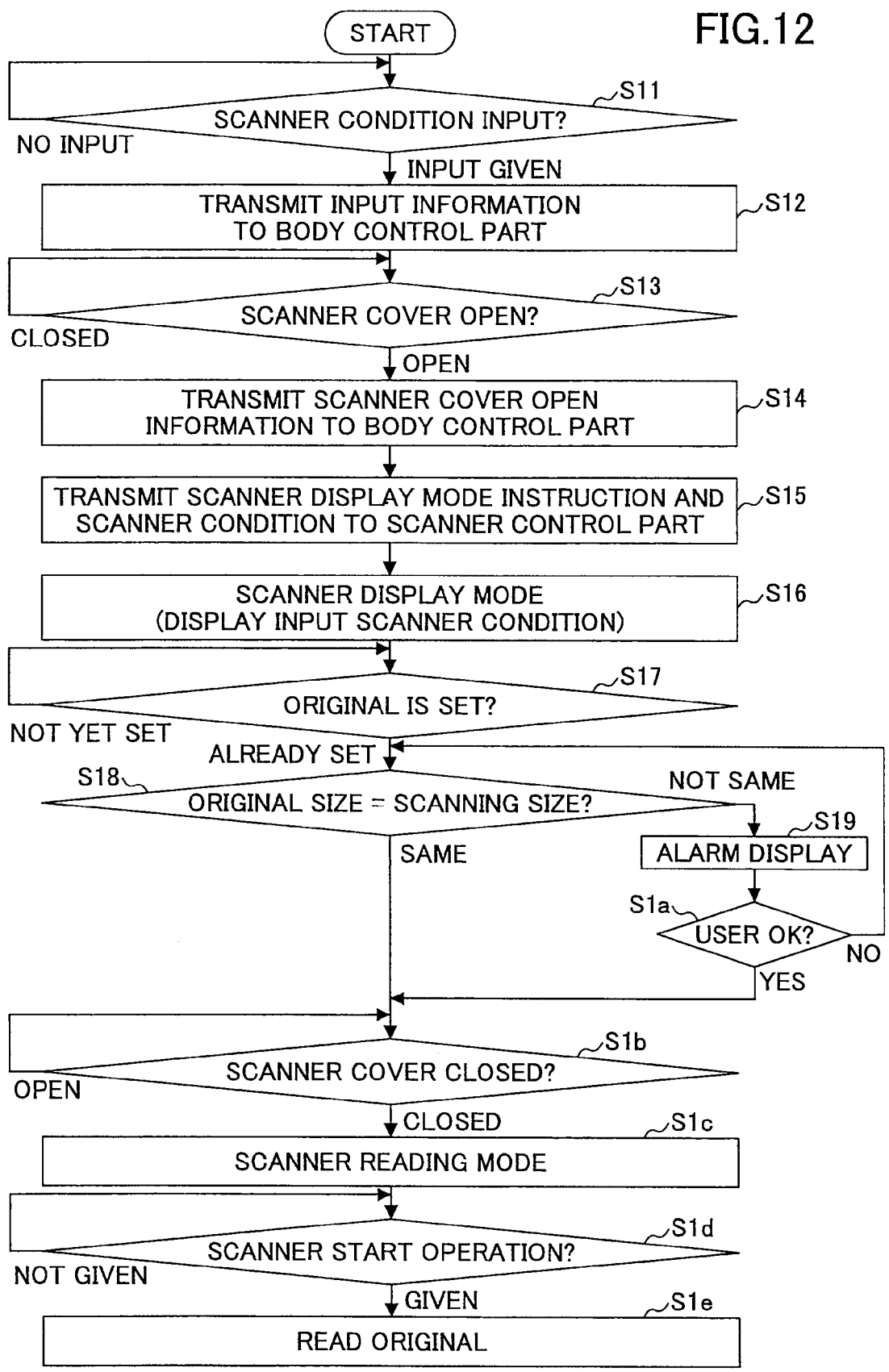

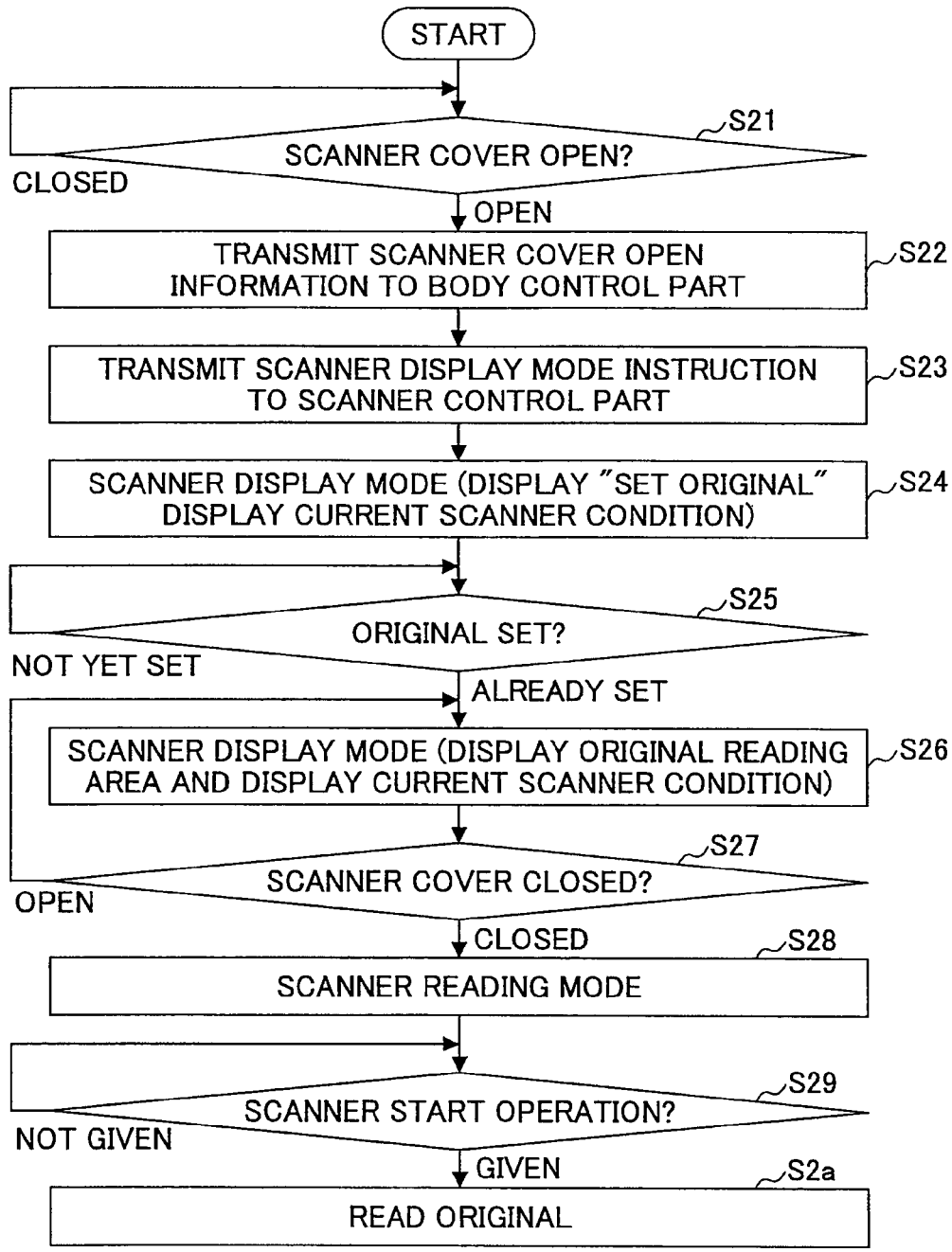

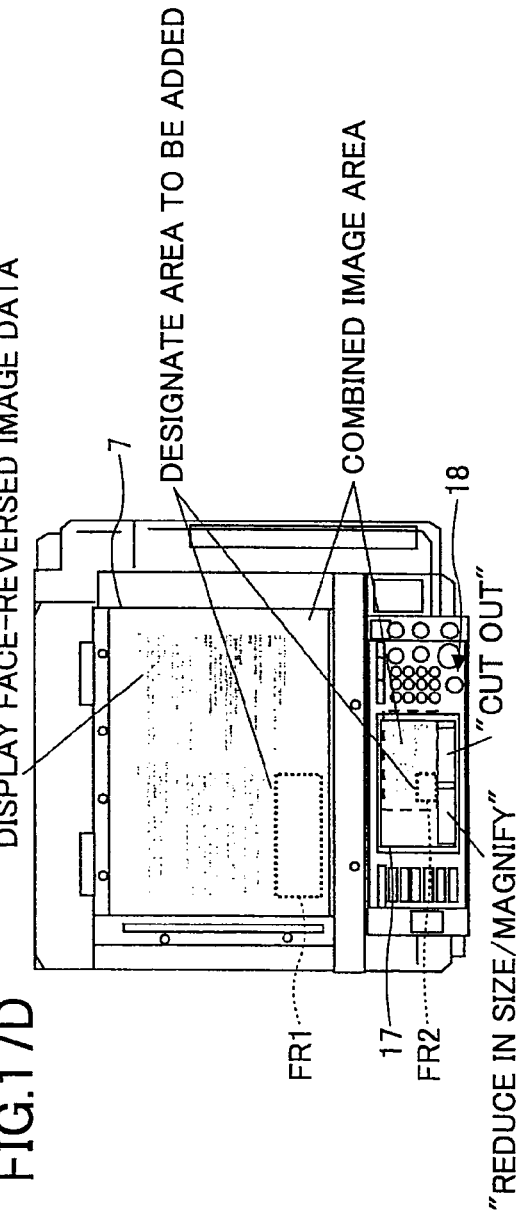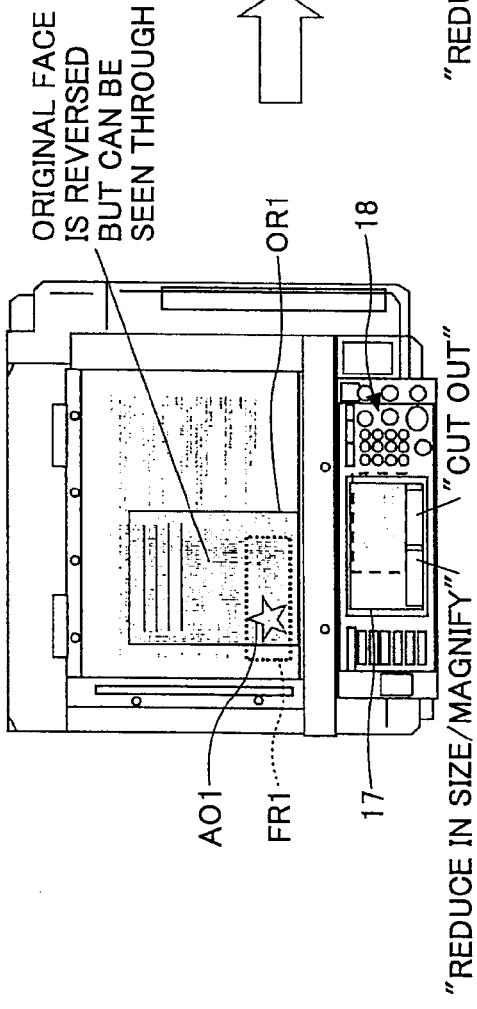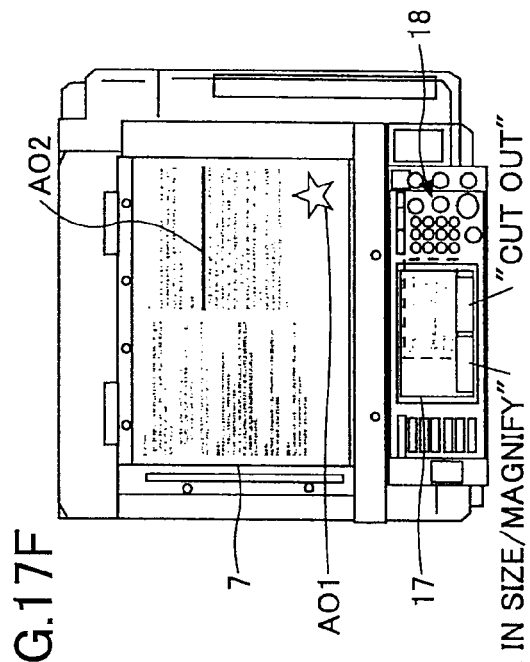
FIG.17D
FIG.17E
FIG.17F

FR11

IMAGE READING APPARATUS AND IMAGE FORMING APPARATUS

BACKGROUND OF THE INVENTION

1. Field of the Invention

The present invention relates to an image reading apparatus such as a copier or a scanner, and an image forming apparatus in which the image reading apparatus is mounted.

2. Description of the Related Art

An image forming apparatus such as a copier includes an image reading apparatus that reads an image of an original and outputs the data having been read to another apparatus for printing the image.

The image reading apparatus may have a size change function of increasing or reducing a size of the image of the original having been read. The size change function may include an automatic size change function and a manual size change function.

In the automatic size change function, the image having been read from the original is changed in its size into a size of predetermined recording paper, and then, the image is printed. That is, the desired size of recording paper is input from an operation part, information of the size of the original placed on an original table is obtained, therefrom a printing magnification is automatically calculated, and printing is carried out according to the calculated printing magnification.

Further, in the manual size change function, a user inputs the desired size of recording paper and the printing magnification from the operation part manually, and printing is carried out based on the input results.

At a time the manual size change function is used, an image size of the original which can be printed onto recording paper is determined by the size of the recording paper and the printing magnification which have been input. Therefrom, a printable area that is an area from which printing is carried out onto recording paper is determined on an original placement area on the original table. In other words, an area of the image of the original other than the printable area is not printed on the recording paper.

Therefore, at the time the manual size change function is used, it is necessary to place the original on the original table in such a manner that an original image to be printed onto the recording paper is placed within the printable area.

Therefore, Patent Document 1 (Japanese Laid-Open Patent Application No. 2000-358131) proposed an image reading apparatus that has a function such that a user can recognize the printable area.

However, in the image reading apparatus proposed in Patent Document 1, LEDs (Light-Emitting Diodes) disposed along a frame of an original table are used as light sources to indicate the printable area, and merely positions in a main can direction and a sub-scan direction are indicated. Therefore, it may be difficult to recognize the entirety of the printable area. Further, information such as a scanner condition is not displayed.

SUMMARY OF THE INVENTION

According to an embodiment of the present invention, an image reading apparatus that reads an image of an original placed on a contact glass and outputs the read image as printing data according to a paper size or a printing magnification which has been set includes the contact glass having a light control glass part that has transmittance which is changed according to a state of a voltage being applied, and having one side that acts as an original placement surface; a scanner part that reads the original placed on the contact glass and outputs image data of the read original in a storage part; a projector part that projects image information onto the contact glass from a side of the contact glass opposite to the original placement surface; and a control part that controls the voltage to be applied to the light control glass part, wherein at a time of the scanner part being operated, the control part controls the voltage to increase the transmittance of the contact glass, and the projector part stops projecting the image information onto the contact glass, and at a time of the scanner part being not operated, the control part controls the voltage to decrease the transmittance of the contact glass, and the projector part carries out first image displaying of projecting the image data stored in the storage part as the image information onto the contact glass.

According to another embodiment of the present invention, an image reading method of reading an image of an original placed on a contact glass and outputting the read image as printing data according to a paper size or a printing magnification which has been set includes reading the image of the original placed on the contact glass having a light control glass part that has transmittance which is changed according to a state of a voltage being applied, and having one side that acts as an original placement surface, and outputting image data of the read original to a storage part; projecting image information onto the contact glass from a side of the contact glass opposite to the original placement surface; and controlling the voltage to be applied to the light control glass part, wherein at the time of reading the image of the original, the voltage is controlled to increase the transmittance of the contact glass, and projecting the image information onto the contact glass is stopped, and at a time of other than the reading the image of the original, the voltage is controlled to decrease the transmittance of the contact glass, and first image displaying of projecting the image data stored in the storage part as the image information onto the contact glass is carried out.

Other objects, features and advantages of the present invention will become more apparent from the following detailed description when read in conjunction with the accompanying drawings.

BRIEF DESCRIPTION OF THE DRAWINGS

FIGS. 5A and 5B illustrate a principle of operation of a liquid crystal sheet shown in FIG. 4B;

FIG. 12 shows a flowchart of a control procedure (1) in the image reading apparatus included in the image forming apparatus according to the embodiment of the present invention;

FIG. 14 shows a flowchart of a control procedure (2) in the image reading apparatus included in the image forming apparatus according to the embodiment of the present invention;

FIGS. 17A, 17B, 17C, 17D, 17E and 17F show one example of a process of combining an image already scanned from the contact glass and additional originals in the image reading apparatus according to the first variant embodiment of the present invention;

DETAILED DESCRIPTION OF THE EMBODIMENTS

An embodiment of the present invention has been devised in consideration of the problems in the related art mentioned above, and an object of the embodiment is to provide an image reading apparatus and an image reading method in which it is possible to avoid a position error of an original and reduce an image reading error, an image forming apparatus using the image reading apparatus, and an image forming method using the image reading method.

Next, the image reading apparatus and the image forming apparatus according to the embodiment of the present invention will be described in detail. It is noted that the embodiment of the present invention is a preferable embodiment of the present invention and therefore, various limitations that are technically preferable are included. However, the scope of the present invention is not limited to the embodiment.

Figure 1A:
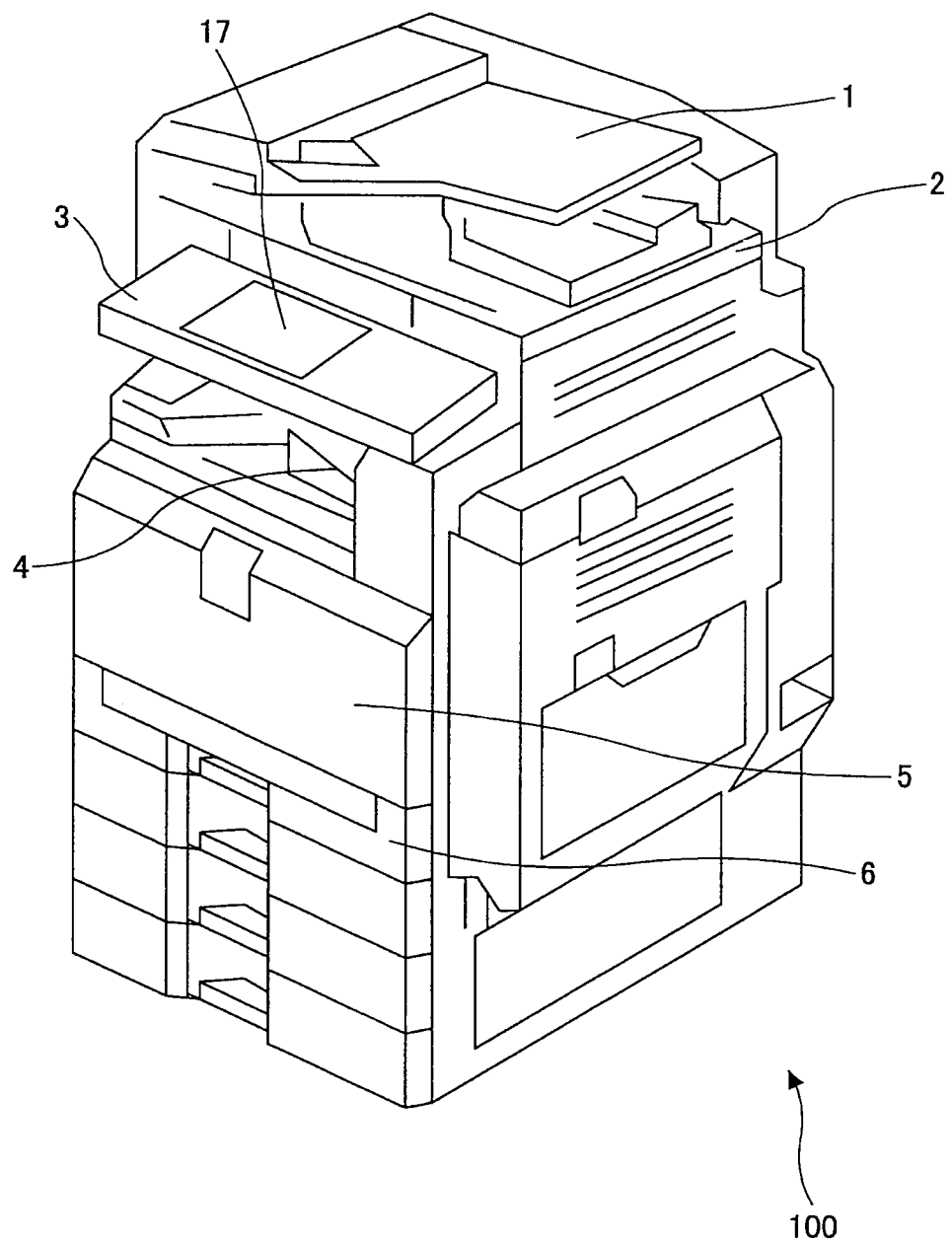
FIGS. 1A, 1B and 1C show an external perspective view of one example of an image forming apparatus according to an embodiment of the present invention.
Figure 1B:
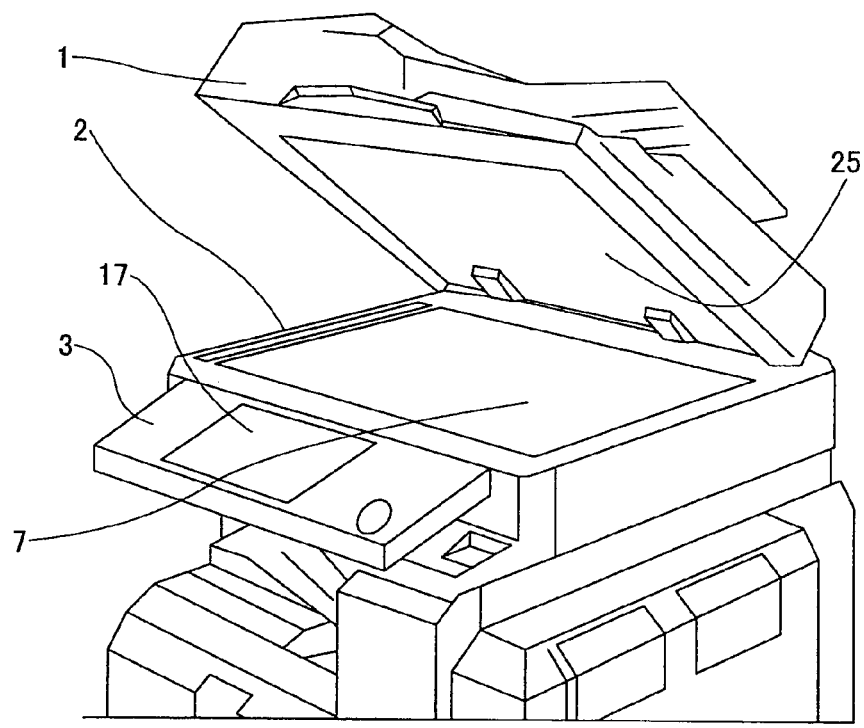
Figure 1C:
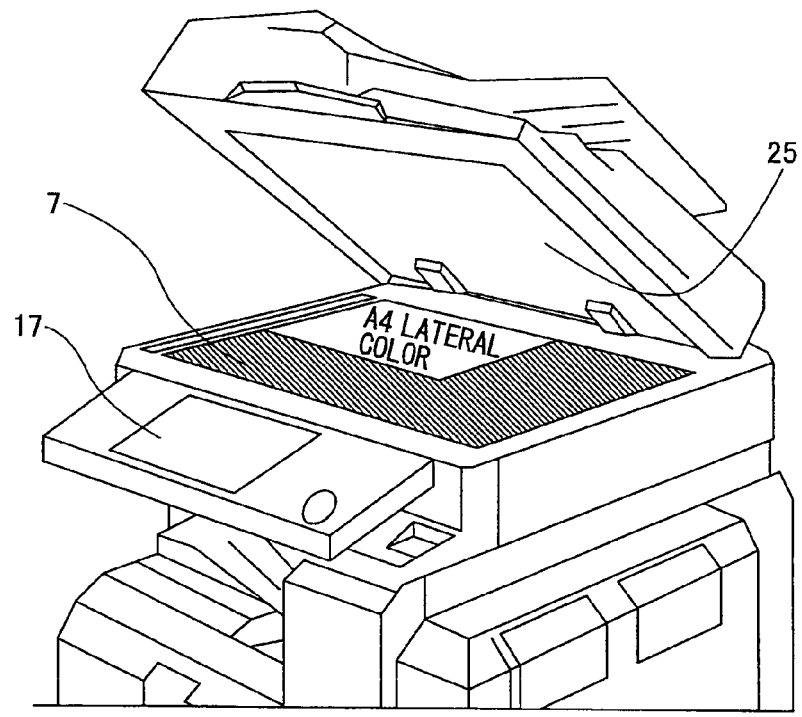

FIG. 1A shows a configuration of the entirety of the image forming apparatus, FIG. 1B shows a configuration around the image reading apparatus of the image forming apparatus in a state in which an automatic document feeder (ADF) has been opened, and FIG. 1C shows a state in which information of an original size is displayed on a light control glass of a contact glass, described later, in the state shown in FIG. 1B.

As shown in FIG. 1A, the image forming apparatus 100 includes the automatic document feeder 1, the image reading apparatus (i.e., a scanner apparatus) 2, an image forming part (i.e., a printer apparatus) 5, and paper trays 6. The ADF 1 feeds an original, which is set to be read, to the image reading apparatus 2. The image reading apparatus 2 according to the embodiment of the present invention reads the original as an image, which original has been sent from the ADF 1 or set on the contact glass (i.e., the light control glass on which an original table is displayed, as described later) 7, and outputs the image, which has been thus read, as printing data according to a paper size or a printing magnification which is set by the user. The image forming part 5 forms an image on a sheet of a predetermined size based on the printing data. The paper trays 6 hold sheets that are recording media for forming images thereon, and supply the sheets to the image forming part 5.

It is noted that the image forming part 5 may be the printer apparatus of known technology such as a printer apparatus of an electrophotographic type or an inkjet recording type, which forms images. Further, in front of the image forming apparatus 100, an operation panel 3 for the user to operate the image forming apparatus 100 and a paper ejection tray 4 to which the sheets on which the images have been formed are ejected, are provided.

It is noted that the ADF 1 is mounted on the image reading apparatus 2 in such a manner to cover an original reading part (i.e., the contact glass 7) of the image reading apparatus 2, and an end part of the ADF 1 on a rear surface side of the image forming apparatus 100 is rotatably fixed to the image reading apparatus 2 by hinges. Further, a bottom surface of the ADF 1 acts as a scanner cover 25 that covers the contact glass 7, the scanner cover 25 rotates about the hinges as the user lifts an end of the ADF 1 on the front side of the image forming apparatus 100, and thus, the scanner cover 25 becomes open so that the contact glass 7 is exposed.

In the state shown in FIG. 1B, the scanner cover 25 is open and the contact glass 7 is exposed. In this state, the user sets an original, that is, for example, a book, on the contact glass 7, then closes the scanner cover 25, and operates the image forming apparatus 100 to read (or scan) an image of the original with the image reading apparatus 2.

In the state of FIG. 1C, the scanner cover 25 is open, the contact glass is exposed, and further, predetermined image information and so forth, which is projected by a projector part 15 (described later), is displayed on the contact glass 7.

Figure 2:
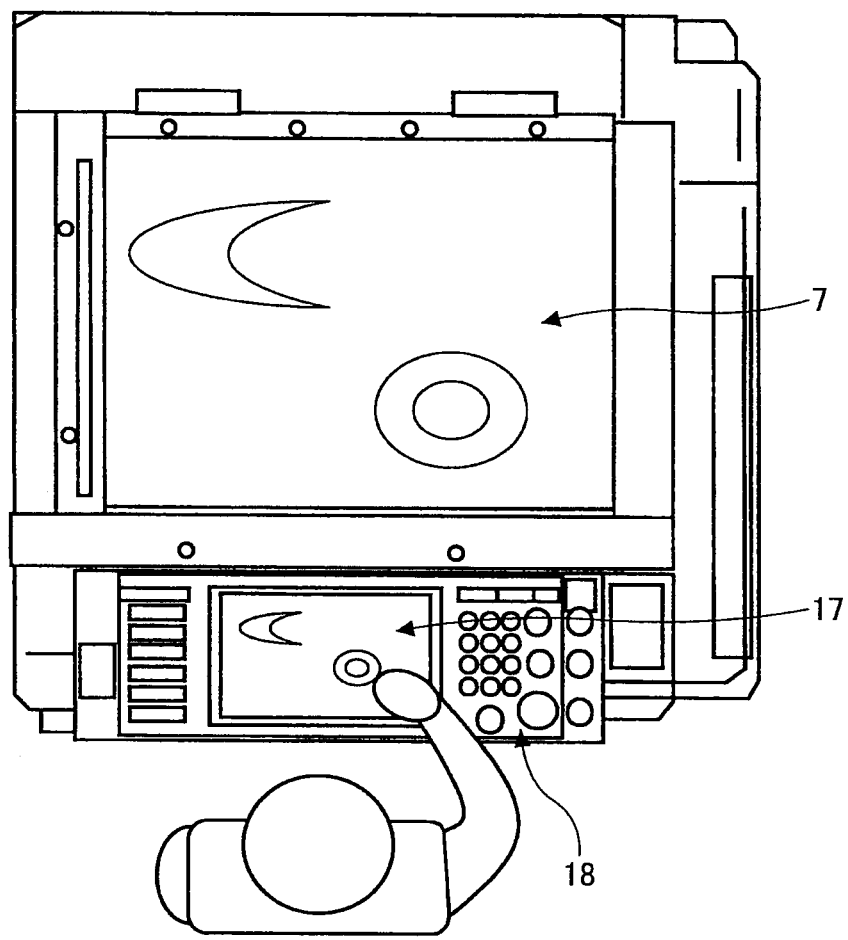
FIG. 2 shows an external plan view of the example of the image forming apparatus according to the embodiment of the present invention.

FIG. 2 shows an external plan view of the image forming apparatus 100 in the embodiment of the present invention. As shown in FIG. 2, the operation panel 3 (including a display part 17 and an input part 18) is disposed at a front position (i.e., on a lower side of FIG. 2) which the user faces and operates. The contact glass 7 is disposed at a position on a rather far side (i.e., on an upper side of FIG. 2). It is noted that in the example shown in FIG. 2, the ADF 1 (or the scanner cover 25) is open, the contact glass 7 is exposed, and further, the predetermined image information or such projected by the projector part 15 is displayed on the contact glass 7.

Next, the image reading apparatus 2 according to the embodiment of the present invention will be described.

Figure 3:
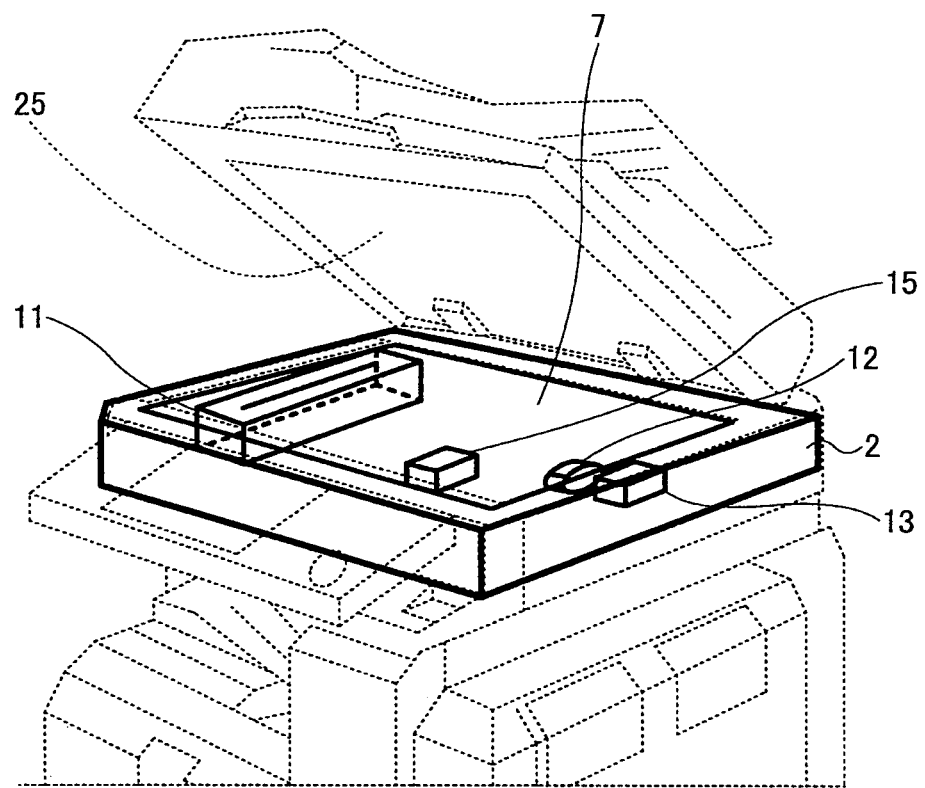
FIG. 3 shows a transparent perspective view showing a configuration of an image reading apparatus 2 included in the image forming apparatus 100.

FIG. 3 shows a transparent perspective view of a configuration of the image reading apparatus 2 included in the image forming apparatus 100. In FIG. 3, the image reading apparatus 2 is drawn by solid lines.

The image reading apparatus 2 has the contact glass 7, a scanner part (described later), the scanner cover 25, a detection part (i.e., scanner cover open sensor 16, described later), and a projector part 15. The contact glass 7 has the light control glass (light control glass part) that has transmittance changed according to a state of a voltage being applied, and a top side of the contact glass 7 functions as an original placement surface on which an original to be read (or scanned) is placed. The scanner part reads an image of the original placed on the contact glass 7. The scanner cover 25 acts as an openable and closable cover of the contact glass 7 and acts as a reflection plate providing a background of the original when the image is read by the scanner part. The detection part detects a state of opening/closing of the scanner cover 25. The projector part 15 projects a specific pattern and/or character information (image information) onto the contact glass 7 from a side opposite to the original placement surface.

Figure 10A:
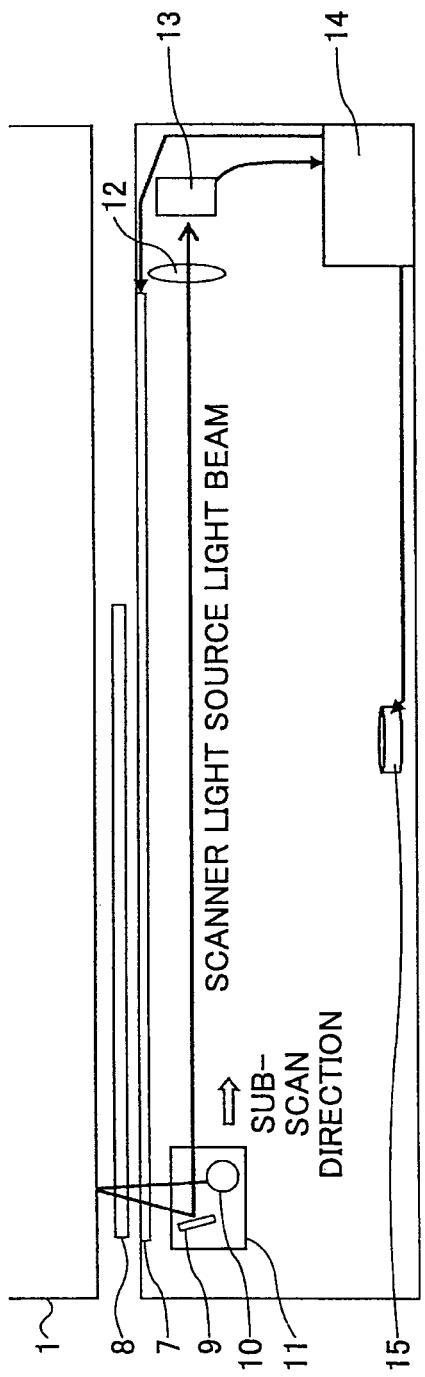
FIGS. 10A and 10B show a sectional view of the image reading apparatus according to the embodiment of the present invention.
Figure 10B:
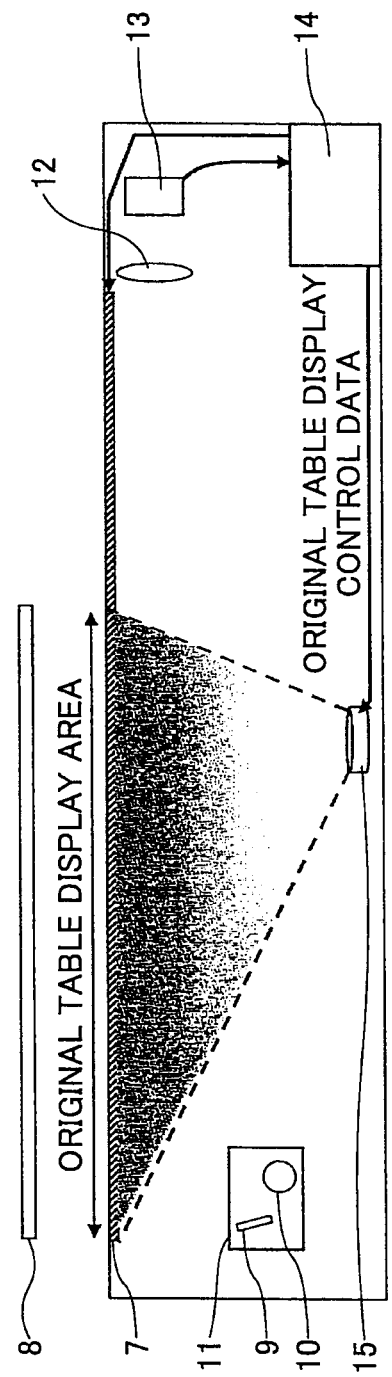
Figure 11:
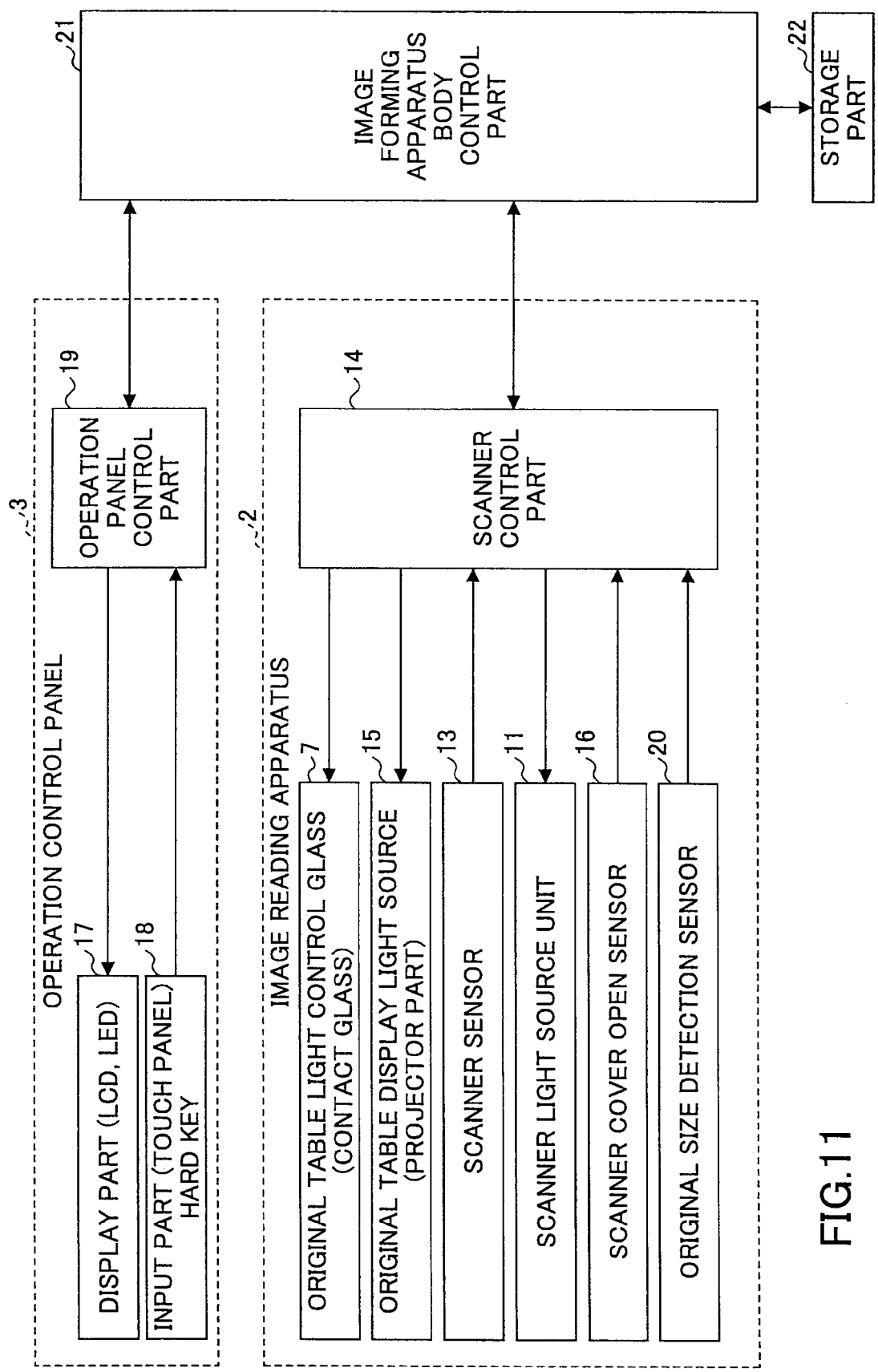
FIG. 11 shows a control block diagram of the image forming apparatus according to the embodiment of the present invention.

The scanner part includes a scanner light source unit 11, a lens 12, a scanner sensor 13 and a part of a scanner control part 14 (see FIGS. 10A, 10B and 11). The part of the scanner control part 14 is a part concerning scanning operations carried out by using the scanner light source unit 11, the lens 12 and the scanner sensor 13.

The scanner light source unit 11 emits a light beam that extends as a line along the width direction of the original and scans the original with the light beam along a longitudinal direction of the original (sub-scan direction). The lens 12 converges light reflected by the original, and the scanner sensor 13 detects the light converged by the lens 12 and outputs a signal. The scanner control part 14 receives the signal output by the scanner sensor 13. It is noted that an image processing part (not shown) is connected to the scanner control part 14. The image processing part outputs an image, which has been originally read by the scanner sensor 13, as printing data according to a paper size or a magnification which is set by the user, to the image forming part 5.

Figure 4A:
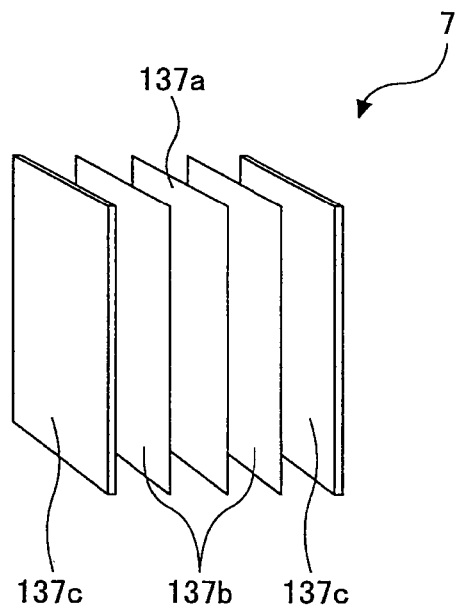
FIGS. 4A and 4B show a configuration of a contact glass according to the embodiment of the present invention.
Figure 4B:
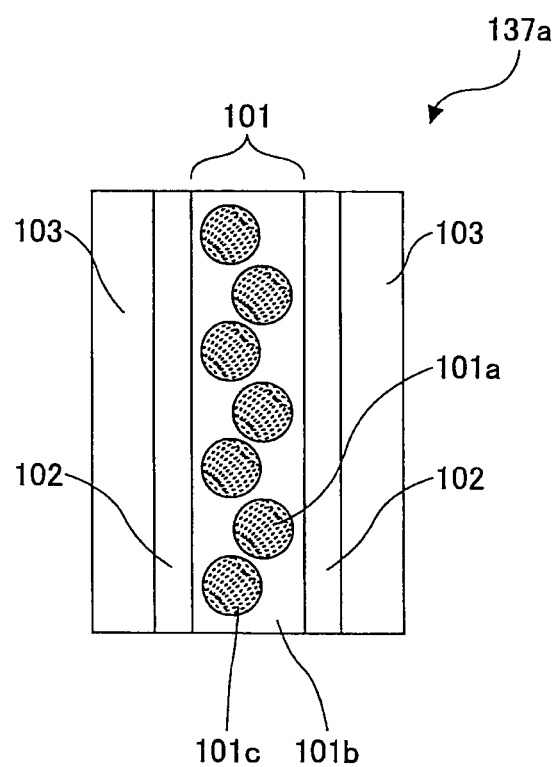

The contact glass 7 has the light control glass, the transmittance of which changes according to a state of a voltage, controlled by the scanner control part 14, applied thereto. FIGS. 4A and 4B show a configuration of the contact glass 7. FIG. 4A shows a perspective view of a configuration of the entirety of the contact glass 7, and FIG. 4B shows a configuration of a liquid crystal sheet 137a included in the contact glass 7.

As shown in FIG. 4A, the contact glass 7 has a configuration such that both principal surfaces of the liquid crystal sheet 137a are sandwiched by transparent sheet glasses 137c via intermediate films 137b, respectively. The intermediate films 137b may be omitted.

The liquid crystal sheet 137a includes, as shown in FIG. 4B, a liquid crystal layer 101, two transparent electrically conductive films 102 and two resin films 103. The liquid crystal layer 101 is such that fine capsules 101c in which liquid crystal molecules are sealed are dispersed in a resin 101b and has a thickness on the order of 20 μm. The transparent electrically conductive films 102 are provided on both sides of the liquid crystal layer 101 and act as electrodes for applying the voltage. The resin films 103 further sandwich the transparent electrically conductive films 103 from the outside to support the transparent electrically conductive films 102 and are made of transparent polyethylene terephthalate (PET).

In the liquid crystal sheet 137a, the voltage can be applied between the two transparent electrically conductive films 102 by the scanner control part 14, the transmittance of the liquid crystal sheet 137a changes according to a state of the voltage being applied, and thus, a transmission state of the contact glass 7 is controlled. FIGS. 5A and 5B show the state.

First, while no voltage is applied between the two transparent electrodes 102 (i.e., at a time of OFF, see FIG. 5A), the arrangement of the liquid crystal molecules 101a in the capsules 101c is irregular, and when parallel rays are incident on the liquid crystal layer 101, the incident parallel rays are bent by the liquid crystal molecules of the irregular arrangement. As a result, the incident light cannot go straight, and passes through the liquid crystal layer 101 in a condition in which the incident light is scattered. Therefore, the exit side of the liquid crystal layer 101 is seemed to be in an opaque state.

Next, while the voltage is applied between the two transparent electrodes 102 (i.e., a time of ON, see FIG. 5B), the arrangement of the liquid crystal molecules 101a in the capsules 101c is regular, and when parallel rays are incident on the liquid crystal layer 101, the incident parallel rays are not bent by the liquid crystal molecules of the regular arrangement. As a result, the incident light passes through the liquid crystal layer in a condition in which the incident light goes straight. Therefore, the exit side of the liquid crystal layer 101 is seemed to be in a transparent state. It is noted that electric power is necessary to thus cause the contact glass 7 to be transparent, and therefore, it is preferable that the voltage is applied only at a time an image is read (or scanned) (i.e., at a time of the scanner part being operated), or at a time a size of an original placed on the contact glass 7 is detected, in the image reading apparatus 2. Thus, it is possible to reduce power consumption.

Figure 6:
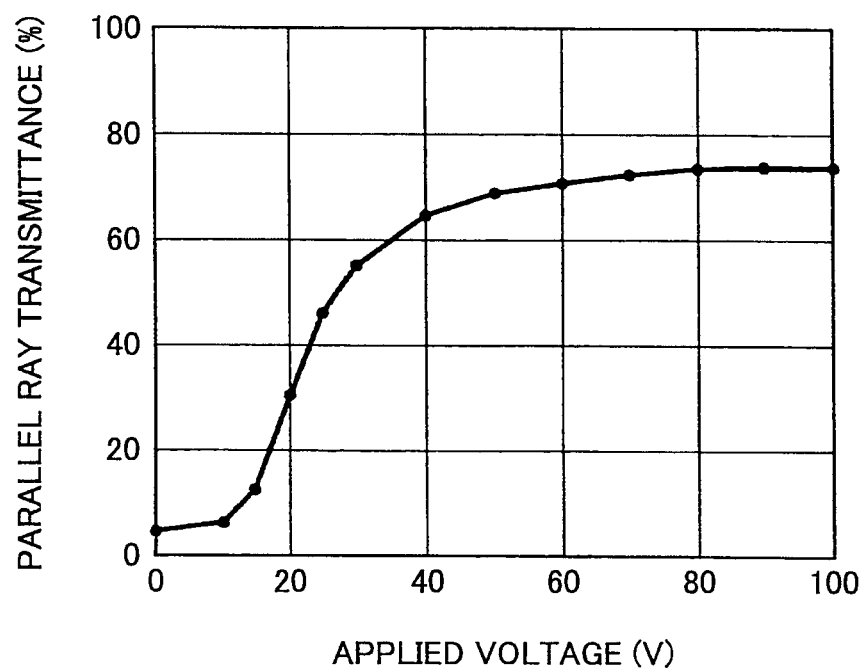
FIG. 6 shows a relationship between an applied voltage and a parallel ray transmittance of the contact glass used in the embodiment of the present invention.

FIG. 6 shows a relationship between the applied voltage and parallel ray transmittance of the liquid crystal sheet 137a.

As shown in FIG. 6, the transmittance is lowest when the applied voltage is 0 V, and the transmittance is highest when the applied voltage exceeds 80 V. Further, in the liquid crystal sheet 137a, intermediate transmittance occurs depending on the applied voltage. Further, a rate at which the transmittance changes is not a fixed rate when the applied voltage changes between 0 through 100 V, and the transmittance greatly changes after the applied exceeds 10 V until the applies voltage reaches 60 V.

As a preferable one for the contact glass 7 described above, for example, a switchable light control glass "UMU" made by a NSG UMU PRODUCTS CO., LTD., for example, may be used. The product specification of the switchable light control glass "UMU" is as follows: power source: AC 100 V (50/60 Hz); power consumption: 3.5 W/m$^2$ (at a time of ON (transparent or see through)); speed of response (OFF (not transparent or not see through)→ON (transparent)): approximately 1/1000 seconds; speed of response (ON (transparent)→OFF (not transparent)): approximately 1/100 seconds; parallel ray transmittance (at a time of transparent): 72%; and parallel ray transmittance (at a time of not transparent: 8%.

The projector part 15 is disposed on a bottom surface of the image reading apparatus 2, and is a liquid crystal projector for displaying the original table (described later). The projector part 15 projects a specific pattern and/or character information (image information) onto the side of the contact glass 7 opposite to the original placement surface (i.e., the surface with which the scanner cover 25 comes into contact).

Figure 7:
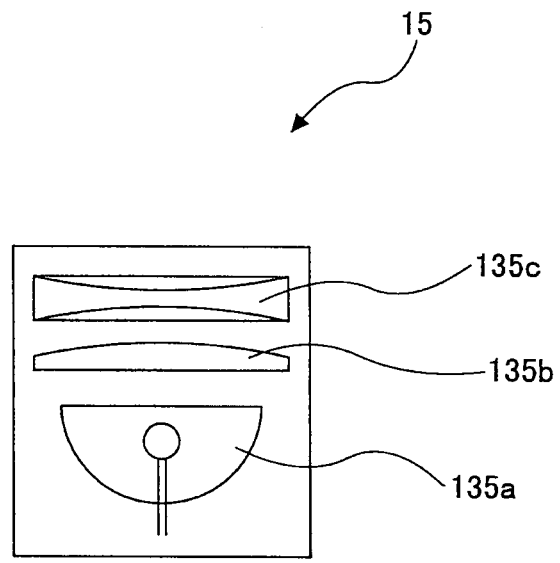
FIG. 7 generally shows a configuration of a projector part.

FIG. 7 shows an example of a configuration of the projector part 15.

As shown in FIG. 7, the projector part 15 includes a light source 135a, a projection lens 135b and a liquid crystal panel 135c. The light source 135a projects visible light from a lower side. The light emitted by the light source 135a passes through the projection lens 135b. The liquid crystal panel 135c is a translucent liquid crystal shutter for displaying the specific pattern and/or character information. When image information or such is to be displayed on the contact glass 7, the scanner control part 14 transmits display data (including image data stored by a storage part 22 described later) to the liquid crystal panel 135c, and the light source 135a emits light in a state in which the display data is displayed on the liquid crystal panel 135c. Thus, the display data of the liquid crystal panel 135c is projected onto the contact glass 7, as a result of the light emitted by the light source 135a passing through the liquid crystal panel 135c after passing through the projection lens 135b and then reaching the contact glass 7.

It is noted that in a case where an area (i.e., the original table) in which the original is to be placed is displayed at a corner part of the contact glass 7 in a state in which the projector part 15 is disposed at a center of the bottom surface of the image reading apparatus 2, an image displayed on the liquid crystal panel 135c is displayed on the contact glass 7 in a state in which the image is distorted in its shape through the projection of the image on the liquid crystal panel 135c onto the contact glass 7.

Figure 8A:
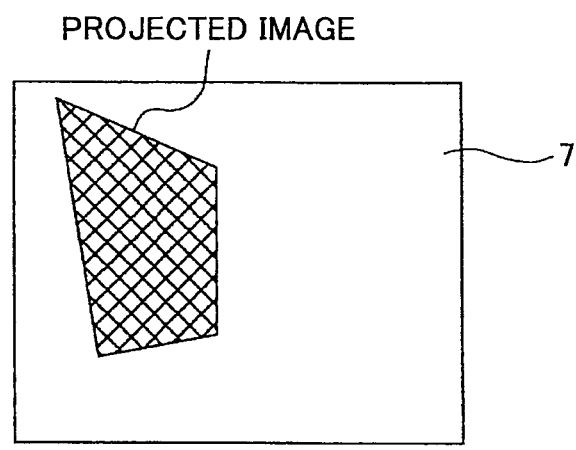
FIGS. 8A and 8B show an example of an image projected onto the contact glass by the projector part included in the image reading apparatus shown in FIG. 3.

FIG. 8A shows an example of the displaying. For example, when a rectangle corresponding to a B5 size in a longitudinal state is displayed, as it is, on the liquid crystal panel 135c, a light flux emitted by the light source 135a and transmitted by the liquid crystal panel 135c is projected onto the contact glass 7. Thus, the image is projected at the top left corner of the contact glass 7. FIG. 8A shows the projected image viewed from the front side of the image forming apparatus 100. Thus, on the contact glass 7, the intended shape is not displayed, but the shape in which a width increases as a distance from the light source 135a increases is displayed as shown in FIG. 8A. Therefore, it may be difficult to place the original on the contact glass 7 appropriately based on the projected image (displayed as the original table). Also in a case where characters (i.e., letters) are projected and displayed onto the contact glass 7, a distortion may occur in the characters similarly.

Figure 8B:
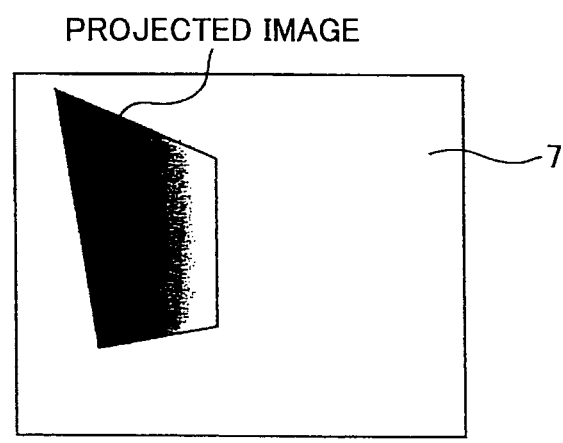

Further, in a case of FIG. 8B, also a rectangle corresponding to a B5 size in a longitudinal state is displayed as an area having a uniform density on the liquid crystal panel 135c, and a light flux emitted by the light source 135a and transmitted by the liquid crystal panel 135c is projected onto the contact glass 7. Thus, the image is projected also at the top left corner of the contact glass 7. FIG. 8B shows the projected image viewed from the front side of the image forming apparatus 100. Thus, on the contact glass 7, as shown in FIG. 8B, luminance may be reduced or unevenness may occur depending on characteristics of the light source 135a and the projection lens 135b, and/or a distance between the light source 135a and the contact glass 7. More specifically, as shown in FIG. 8B, near the end of the contact glass 7, the projected image is magnified by the projection lens 135b in comparison to the center of the contact glass 7. Therefore, near the end of the contact glass 7, the light flux is dispersed and luminance is reduced (i.e., a light flux density per unit area decreases). Thus, unevenness in luminance may occur in the projected image.

Figure 9A:
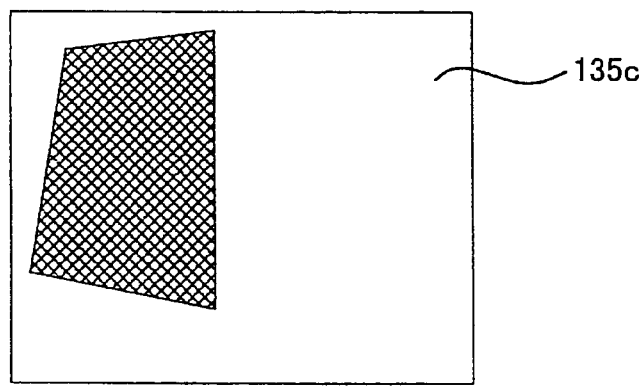
FIGS. 9A and 9B show an example of displaying on a liquid crystal panel included in the projector part shown in FIG. 7.

In order to solve the problems, it is preferable to modify display information in the projector part 15. First, against a distortion in shape as shown in FIG. 8A, it is preferable to correct the display information in the projector part 15 depending on an angle of the projection from the liquid crystal panel 135a to the contact glass 7 so that the shape of the projected image on the contact glass 7 becomes the proper shape (i.e., the intended shape). FIG. 9A shows one example of a displayed image on the liquid crystal panel 135c which image has been corrected so as to properly display the projected image of B5 size in the longitudinal state. It is possible to properly display the projected image of B5 size in the longitudinal state on the contact glass 7 as a result of the projection being carried out by using this example of the displayed image on the liquid crystal panel 135c.

Figure 9B:
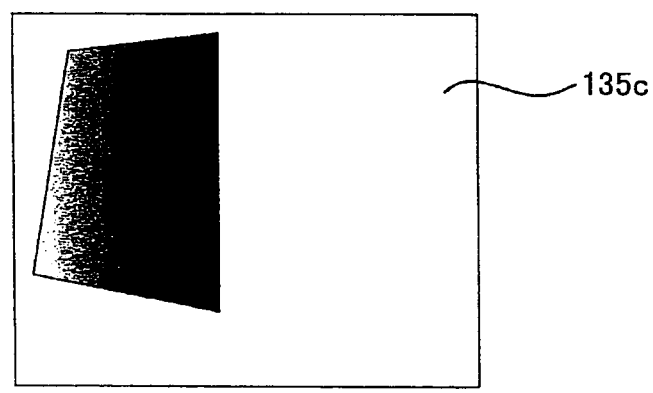

Further, against a distortion in shape and luminance unevenness such as that shown in FIG. 8B, in addition to the correction of the displayed image on the liquid crystal panel 135c as shown in FIG. 9A, it is preferable to correct a density of the display information in the projector part 15 depending on an angle of the projection from the liquid crystal panel 135a to the contact glass 7 so that also the density of the projected image on the contact glass 7 becomes uniform. FIG. 9B shows one example of a displayed image on the liquid crystal panel 135c which image has been corrected so as to properly display the projected image of B5 size in the longitudinal state. It is possible to display the projected image of B5 size in the longitudinal state on the contact glass 7 with the proper shape and uniform brightness as a result of the projection being carried out by using this example of the displayed image on the liquid crystal panel 135c.

FIGS. 10A and 10B show an internal configuration of the image reading apparatus 2 according to the embodiment of the present invention. FIG. 10A shows a state in which an image is read (i.e., a scanner reading mode or for a time of the scanner part being operated), and FIG. 10B shows a state in which the original table is displayed on the contact glass 7 (i.e., a scanner display mode or for a time of the scanner part being not operated).

In FIG. 10A, the scanner cover 25 is closed in a state in which the original 8 is placed on the contact glass 7, and in this state, an image of the original 8 is read in an ordinary method. That is, in the state of FIG. 10A, the detection part detects the closed state of the scanner cover 25, and the scanner control part 14 increases the transmittance of the contact glass 7 by applying the voltage to the contact glass 7, and stops projecting image information onto the contact glass 7 from the projector part 15. It is noted that "stopping projecting image information onto the contact glass 7 from the projector part 15" may include a state where no image information is projected onto an area on the contact glass 7 to be read by the scanner part 2 (i.e., an area on the contact glass 7 from which the scanner sensor 13 receives reflected light). That is, such a configuration that the scanner part itself blocks projection from the projector part 15 may be provided, and therefore, although the projector part 15 projects some image information, it may be possible to treat such a state as the state of substantially "stopping projecting image information onto the contact glass 7 from the projector part 15" as long as nothing obstructs the operation of reading or scanning the original 8 by the scanner part. It is noted that in viewpoint of saving power, it is preferable, of course, not to project image information when it is not necessary to do so, and it is preferable that image information is projected onto a necessary area on the contact glass 7 when it is necessary.

Then, reading the original 8 is actually started as a result of a scanner start operation or such being carried out by the user. Specifically, the scanner light source unit 11 including a scanner mirror 9 and a scanner light source 10 in the inside thereof moves in the sub-scan direction to scan the original 8. At this time, light for reading the original 8 is emitted by the scanner light source 10, and the emitted light passes through the contact glass 7 being transparent and thus passing light therethrough, and is reflected by the original 8 or the scanner cover 25. Then, the reflected light again passes through the contact glass 7, and reaches the scanner sensor 13 after being reflected by the scanner mirror 13 and passing through the lens 12. The scanner sensor 13 converts the received light into an electric signal and thus, obtains image data, and transmits the image data to the scanner control part 14. Next, the scanner control part 14 transmits the image data to the image processing part, and the image processing part transmits the image data to the storage part 22 (or further, to the image forming part 5) after obtaining printing data according to a paper size of a magnification which has been set by the user.

In the state of FIG. 10B, the scanner cover 25 is open, the contact glass 7 is thus exposed, and the original 8 is to be placed. In this state, the original table is displayed on the contact glass 7 in which the specific pattern and/or character information is displayed on the contact glass 7. That is, in the state of FIG. 10B, the detection part detects the open state of the scanner cover 25, and the scanner control part 14 reduces (i.e., decreases) the transmittance of the contact glass 7 by stopping applying the voltage to or reducing the voltage applied to the contact glass 7, and thus causes the contact glass 7 to enter a state of a frosted glass or a state of becoming black. Then, the scanner control part 15 transmits display data to the projector part 15, and the projector part 15 displays the transmitted display data on the liquid crystal panel 135c. In this state, the light source 135a is caused to emit light, and thus, a paper size which has been set by the user or an area of the original 8 which area is to be read according to a printing magnification which has been set by the user is projected on the contact glass 7 as the original table in such a manner that the user can see the projected image. The user sees the displayed original table, and thus, can place the original 8 to correspond to the position of the displayed original table. It is noted that at this time, the scanner light source unit 11 has moved to a position under the image reading apparatus 2 from the position of FIG. 10A, and thus, the light path of the projected light from the projector part 15 is not blocked by the scanner light source unit 11.

Next, control of the image reading apparatus in the image forming apparatus according to the embodiment of the present invention will be described.

FIG. 11 shows a control block diagram of the image forming apparatus according to the embodiment.

The image forming apparatus 100 includes the operation panel 3, the image reading apparatus 2, a body control part 21, and the storage part 22. The body control part 21 carries out control of the entirety of the image forming apparatus. The storage part 22 stores various data that is processed in the body control part 21. According to the embodiment, the storage part 22 is provided in the outside of the image reading part 2. However, the storage part 22 may be provided in the inside of the image reading part 2.

The operation panel 3 includes the display part 17, the input part (operation part) 18, and an operation panel control part 19. The display part 17 includes a liquid crystal display (LCD) or a light emitting diode (LED) for the user's acknowledgement and/or displaying data to the user. The input part 18 includes a touch panel, hard keys or such for the user to input data or instructions. The operation panel control part 19 controls the display part 17 and the input part 18, and communicates with the body control part 21.

The image reading apparatus 2 includes the contact glass 7, the projector part 15 acting as a light source to display the original table, the scanner sensor 13, the scanner light source 11, a scanner cover open sensor (i.e., the detection part) 16 that detects the open/closed state of the scanner cover 25, an original size detection sensor 20 that detects a size of the original 8 placed on the contact glass 7, and the scanner control part 14 that controls the above-mentioned parts, and communicates with the body control part 21.

<Control Procedure (1) of Image Reading Apparatus at Time of Reading Original>

FIG. 12 shows a flowchart of a control procedure (i.e., a control procedure (1)) of the image reading apparatus in the image forming apparatus according to the embodiment of the present invention. Here, a case where the user first has input a scanner condition is shown.

After the user first inputs a scanner condition from the input part 18 of the operation part 3 ("INPUT GIVEN" of step S11), the operation panel control part 19 transmits the input information (i.e., scanner condition data) to the body control part 21 (step S12).

Next, the scanner cover open sensor 16 detects whether the scanner cover 25 is open (step S13). After it is detected that the scanner cover 25 is open ("OPEN" in step S13), the scanner control part 14 transmits scanner cover open information to the body control part 21 (step S14).

After receiving the scanner cover open information, the body control part 21 transmits to the scanner control part 14 an instruction to switch to the scanner display mode (i.e., for the time of the scanner part being not operated) and the scanner condition that has been input by the user (i.e., the input scanner condition) (step S15).

The scanner control part 14 receives the instruction to switch to the scanner display mode and the scanner condition, and thus, enters the scanner display mode (see FIG. 10B) (step S16). Specifically, the scanner control part 14 reduces the transmittance of the contact glass 7 by stopping applying the voltage to or reducing the voltage applied to the contact glass 7, thus, causes the contact glass 7 to enter the frosted glass state or the state of becoming black, and transmits display data based on the scanner condition to the projector part 15. Further, the scanner control part 14 moves the scanner light source unit 11 downward so that blocking of the light path of the projection carried out by the projector part 15 by the scanner light source unit 11 is prevented. Then, the original table is displayed on the contact glass 7 in which the specific pattern and/or character information based on the input scanner condition is projected and displayed onto the contact glass 7. It is noted that it is preferable that in a state in which the scanner cover 25 is open, the user (i.e., the operator) can adjust the voltage to be applied to the contact glass 7 and/or the projection output of the projector part 15 in a state in which the user can see the projected image.

An example of the original table is one shown in FIG. 1C. In the state of FIG. 1C, the scanner cover 25 is open, and predetermined information (i.e., character information of "A4 LATERAL COLOR" (meaning A4 size in the lateral state) and an area onto which the original is to be placed) projected by the projector part 15 is displayed on the contact glass 7.

It is preferable that the image information (i.e., the predetermined information) projected by the projector part 15 onto the contact glass 7 includes, in addition to the original reading area information displayed by the pattern (i.e., the information indicating the area of the size of the original from which area the image reading apparatus 2 reads the image), character information of at least one of the information indicating the size of the original in which size the image can be read, information indicating whether the original is in a lateral or longitudinal state (i.e., whether the original uses paper where the lateral (or horizontal) length is greater than the longitudinal (or vertical) length (as shown in FIG. 1C, for example) or the longitudinal length is greater than the lateral length), and information indicating whether printing is carried out in color or monochrome, is projected onto the contact glass 7.

Figure 13A:
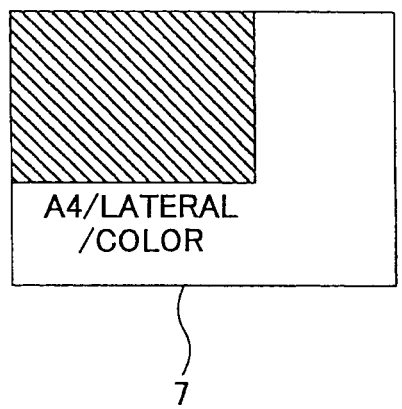
FIGS. 13A and 13B show examples of displaying of an original table at a time of a scanner display mode (i.e., a time of a scanner part being not operated) in the image forming apparatus according to the embodiment of the present invention.
Figure 13B:
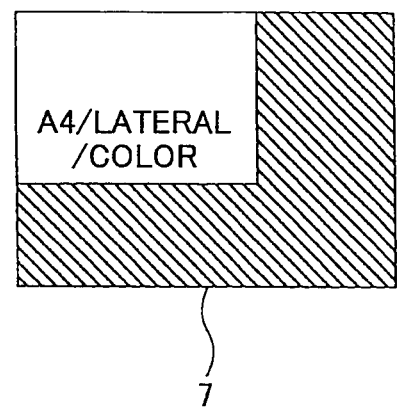

FIGS. 13A and 13B show examples of the information projected by the projector part 15 onto the contact glass 7.

FIG. 13A is an example of displaying in which the area of the size of the original from which area the image reading apparatus 2 reads the image and the character part are included in the projected image. That is, in the example of FIG. 13A, the projector part 15 projects light onto the area (indicated as being hatched) of the size of the original from which area the image reading apparatus 2 reads the image, and does not project light onto the area (indicated as being blank) other than the area of the size of the original from which area the image reading apparatus 2 reads the image, except the projection of the character information described later. As a result, the area other than the area of the size of the original from which area the image reading apparatus 2 reads the image on the contact glass 7 has the ground color (i.e., the ground color in the state of the frosted glass or the state of becoming black), as it is, in the condition in which the transmittance of the contact glass 7 is low. Further, in the example of FIG. 13A, the character information (i.e., A4/LATERAL/COLOR), i.e., the information that has been set by the user, including the information "A4" indicating that the size of the original in which size the original can be read is A4 size, the information "LATERAL" indicating that the original is in the lateral (not longitudinal) state, and the information "COLOR" indicating that printing is carried out in color (not monochrome) in the area other than the area of the size of the original from which area the image reading apparatus 2 reads the image.

FIG. 13B is an example of displaying in which the projector part 15 does not project light onto the area (indicated as being blank) of the size of the original from which area the image reading apparatus 2 reads the image, except the projection of the character information described later. As a result, the area of the size of the original from which area the image reading apparatus 2 reads the image on the contact glass 7 has the ground color (i.e., the ground color in the state of the frosted glass or in the state of becoming black), as it is, in the condition in which the transmittance of the contact glass 7 is low. On the other hand, in the example of FIG. 13B, the projector part 15 projects light onto the area (indicated as being hatched) other than the area of the size of the original from which area the image reading apparatus 2 reads the image. Further, in the example of FIG. 13B, the character information (i.e., A4/LATERAL/COLOR), i.e., the above-mentioned information that has been set by the user, is displayed on the contact glass 7 in the area of the size of the original from which area the image reading apparatus 2 reads the image.

It is preferable that the user can select one of the display styles of FIGS. 13A and 13B, i.e., as display styles to display the area from which the image is read, including the display style of FIG. 13A in which the area from which the image is read is projected and the display style of FIG. 13B in which the area from which the image is read corresponds to the ground color in the condition in which the transmittance of the contact glass 7 is low.

The user can thus appropriately place the part of the original, which part is to be read, onto the contact glass 7 based on the displayed original table (as shown in FIGS. 13A and 13B, for example). Further, on the contact glass 7, in addition to the area from which the image is read, the information of the original to be placed, and the information concerning the mode and/or the condition of the scanning, are projected in a form of characters or a diagram. Therefore, the user can use the scanning properly according to the information displayed on the contact glass 7 without need to move his or her line of sight toward the operation panel 3.

Next, in FIG. 12, the original size sensor 20 detects whether the original has been placed on the contact glass 7 (step S17). After the original is detected (step S17, "ALREADY SET"), the scanner control part 14 determines whether the size of the original determined by the original size sensor 20 is the same as the size of the original which has been input by the user from the operation panel 3 (step S18). When it has been determined that the size of the original determined by the original size sensor 20 is not the same as the size of the original which has been input by the user from the operation panel 3 (step S18, "NOT SAME"), this matter is reported to the user as an alarm or warning (step S19). For example, displaying an alarm may be carried out on the operation panel 3 or on the contact glass 7 in the scanner display mode. Next, it is determined whether such an input has been given from the operation panel 3 that the user has acknowledged ("OK") the displaying of the alarm (step S1$a$). When it has been determined that such an input has not been given from the operation panel 3 that the user has acknowledged ("OK") the displaying of the alarm (step S1$a$, NO), the operation is returned to step S18, and the scanner control part 14 determines whether the size of the original determined by the original size sensor 20 is the same as the size of the original which has been input by the user from the operation panel 3.

When it has been determined that such an input has been given from the operation panel 3 that the user has acknowledged ("OK") the displaying of the alarm (step S1$a$, YES), or when it has been determined that the size of the original determined by the original size sensor 20 is the same as the size of the original which has been input by the user from the operation panel 3 (step S18, "SAME"), waiting for the scanner open sensor 16 detecting that the scanner cover 25 has been closed is carried out (step S1$b$).

After the scanner open sensor 16 detects that the scanner cover 25 has been closed (step S1$b$, "CLOSED"), the image reading apparatus 2 enters the scanner reading mode (see FIG. 10A, for the time of the scanner part being operated) from the scanner display mode, and thus, the image reading apparatus 2 enters the state of being able to read the image from the original 8 (step S1$c$). That is, the scanner control part 14 increases the transmittance of the contact glass 7 by increasing the voltage applied to the contact glass 7 so as to cause the contact glass 7 to be in a transparent state, moves the scanner light source unit 11 to a position of waiting for reading the original 8 (i.e., a starting point in the sub-scan direction in an upper part of the image reading apparatus 2), and enters a state of waiting for the user's instruction to start the scanning (step S1$d$).

Finally, after the user gives an input from the operation panel 3 to start the scanning (i.e., to execute reading by the scanner part) (step S1$d$, "GIVEN"), the scanner part starts reading the original (step S1$e$). That is, the scanner light source unit 11 moves in the sub-scan direction and emits light to the original, and the scanner sensor 13 obtains original data from the light reflected by the original and transmits the original data to the scanner control part 14. Next, the scanner control part 14 transmits the original data to the body control part 21 and thus, the original data is stored in the storage part 22.

<Control Procedure (2) of Image Reading Apparatus at Time of Reading Original>

FIG. 14 shows a flowchart showing another example of control procedure (i.e., a control procedure (2)) of the image reading apparatus 2 in the image forming apparatus 100 according to the embodiment of the present invention. Here, a case where the user does not input the scanner condition, and an initial setting or the scanner condition that has been already input until then is used as a current scanner condition is shown.

First, the scanner cover open sensor 16 detects whether the scanner cover 25 is open (step S21). After it is detected that the scanner cover 25 is open ("OPEN" in step S21), the scanner control part 14 transmits scanner cover open information to the body control part 21 (step S22).

After receiving the scanner cover open information, the body control part 21 transmits to the scanner control part 14 an instruction to switch to the scanner display mode (i.e., for the time of the scanner part being not operated) and the initial setting or the scanner condition that has been already input until then (i.e., the current scanner condition) (step S23).

The scanner control part 14 receives the instruction to switch to the scanner display mode and the scanner condition, and thus, enters the scanner display mode (i.e., for the time of the scanner part being not operated, see FIG. 10B) (step S24). Specifically, the scanner control part 14 reduces the transmittance of the contact glass 7 by stopping applying the voltage to or reducing the voltage applied to the contact glass 7, thus, causes the contact glass 7 to enter the frosted glass state or the state of becoming black, and transmits display data based on the scanner condition to the projector part 15. Further, the scanner control part 14 moves the scanner light source unit 11 downward so that blocking of the light path of the projection carried out by the projector part 15 by the scanner light source unit 11 is prevented. Then, based on the current scanner condition, the information indicating the size of the original in which size the image is read, the information indicating whether the original is in the lateral or longitudinal state, and the information indicating whether printing is carried out in color or monochrome, and in addition, a message urging the user to set the original onto the contact glass 7 such as "SET ORIGINAL", are projected by the projector part 15 and displayed onto the contact glass 7.

Next, the original size sensor 20 detects whether the original has been placed on the contact glass 7 (step S25).

After the original is detected (step S25, "ALREADY SET"), the scanner control part 14 detects the size of the original by using the original size detection sensor 20, and, in the scanner display mode (see FIG. 10B), displays the original table on the contact glass 7, i.e., displays the area of the size of the original from which area the image reading apparatus 2 reads the image with respect to the detected original size (step S26). The specific display style in the displaying the original table may be any one of those shown in FIGS. 13A and 13B. Also in this case, it is preferable that the user can select any one of the display styles shown in FIGS. 13A and 13B.

Based on the original table displayed on the contact glass 7, the user can confirm whether the part of the original to be read has been properly disposed on the contact glass 7.

Then, waiting for the scanner open sensor 16 detecting that the scanner cover 25 has been closed is carried out (step S27).

After the scanner open sensor 16 detects that the scanner cover 25 has been closed (step S27, "CLOSED"), the image reading apparatus 2 enters the scanner reading mode (see FIG. 10A, for the time of the scanner part being operated) from the scanner display mode, and thus, the image reading apparatus 2 enters the state of being able to read the image from the original (step S28). That is, the scanner control part 14 increases the transmittance of the contact glass 7 by increasing the voltage applied to the contact glass 7 so as to cause the contact glass 7 to be in the transparent state, moves the scanner light source unit 11 to the position of waiting for reading the original (i.e., the starting point in the sub-scan direction in the upper part of the image reading apparatus), and enters the state of waiting for the user's instruction to start the scanning (step S29).

Finally, after the user gives an input from the operation panel 3 to start the scanning (i.e., to execute reading by the scanner part), the scanner part starts reading the original 8 (step S2a). That is, the scanner light source unit 11 moves in the sub-scan direction and emits light to the original, and the scanner sensor 13 obtains original data from the light reflected by the original and transmits the original data to the scanner control part 14. Next, the scanner control part 14 transmits the original data to the body control part 21 and thus, the original data is stored in the storage part 22.

It is noted that during the control procedures of the image reading apparatus 2 in the image forming apparatus shown in FIGS. 12 and 14, in a state in which the image reading apparatus 2 cannot read the original, the following operation may be carried out. That is, after the detection part (i.e., the scanner cover open sensor 16) detects that the scanner cover 25 is open (i.e., the open state) (step S13 or S21, "OPEN"), the transmittance of the contact glass 7 is reduced and the scanner display mode is entered, and message information such as "SCAN NG" indicating that the current state is such that the image cannot be read is projected onto the contact glass 7.

Further, when the current state is such that immediately after the image forming apparatus has been started up, and thus, the image reading apparatus 2 cannot read the image of the original 8, the following operation may be carried out. That is, after the detection part (i.e., the scanner cover open sensor 16) detects that the scanner cover 25 is open (i.e., the open state) (step S13 or S21, "OPEN"), the transmittance of the contact glass 7 is reduced and the scanner display mode is entered, and message information such as "WAIT 2 min" indicating that the current state is a standby state at a time of starting up is projected onto the contact glass 7.

It is noted that in the control procedure (1) (one example) described above with reference to FIG. 12 and the control procedure (2) (another example) described above with reference to FIG. 14, switching between the scanner display mode (for the time of the scanner part being not operated) and the scanner reading mode (for the time of the scanner part being operated) is controlled in synchronization with opening and closing of the scanner cover 25. However, the control of switching between the scanner display mode and the scanner reading mode is not limited to this method.

For example, even in a state in which the scanner cover 25 is open, the scanner reading mode may be forcibly entered and scanning operation (i.e., operation of reading the original described above as the operation in step S1e of FIG. 12 or S2a of FIG. 14) may be started in response to an input to start scanning being given from the operation panel 3.

<Displaying on Contact Glass 7 (First Image Displaying) and Displaying on Display Part 17 (Second Image Displaying)>

In the image reading apparatus 2 according to the embodiment of the present invention, from the original placed on the contact glass 7 or the original fed from the ADF 1, image information is read and is stored in the storage part 22.

It is noted that the image information stored in the storage part 22 may be immediately transmitted to the image forming part 5, and based on the image information, an image may be formed by the image forming part 5, without a preview display function described later being carried out.

However, a problem may occur when forming an image (i.e., printing) is carried out without confirmation of an image to be output (printed). For example, a desired image cannot be obtained through the printing in a case where the position of the original is shifted when the original is placed on the contact glass 7, a case where the original is placed on the ADF 1 upside down, or such. Further, recently, as digital copiers become to have high performance, various image processing functions are included in the digital copiers. In such circumstances, it may be difficult to expect an actual image to be output through the printing before the printing.

It is possible to confirm the actual image to be output by actually outputting (printing) the image. However, in this method, recording paper may be wasted.

Therefore, in an image reading apparatus according to a first variant embodiment of the present invention, the preview display function is included in which the image information having been read through the image reading apparatus 2 and stored in the storage part 22 is displayed on the contact glass 7 (i.e., first image displaying). Further, in the image reading apparatus according to the first variant embodiment of the present invention, the image information having been read through the image reading apparatus and stored in the storage part 22 is displayed also on the display part 17 (however, in a state in which the size of the image has been reduced) (i.e., second image displaying).

The image reading apparatus according to the first variant embodiment and an image forming apparatus according to the first variant embodiment including the image reading apparatus according to the first variant embodiment are approximately the same as the image reading apparatus and the image forming apparatus according to the embodiment described above with reference to FIGS. 1A through 14, respectively. Therefore, duplicate description is omitted and mainly different points will now be described.

FIGS. 15A, 15B, 15C and 15D illustrate one example of the preview display function using the contact glass 7 and one example of the preview display function using the display part 17.

Thumbnail Displaying

Figure 15A:
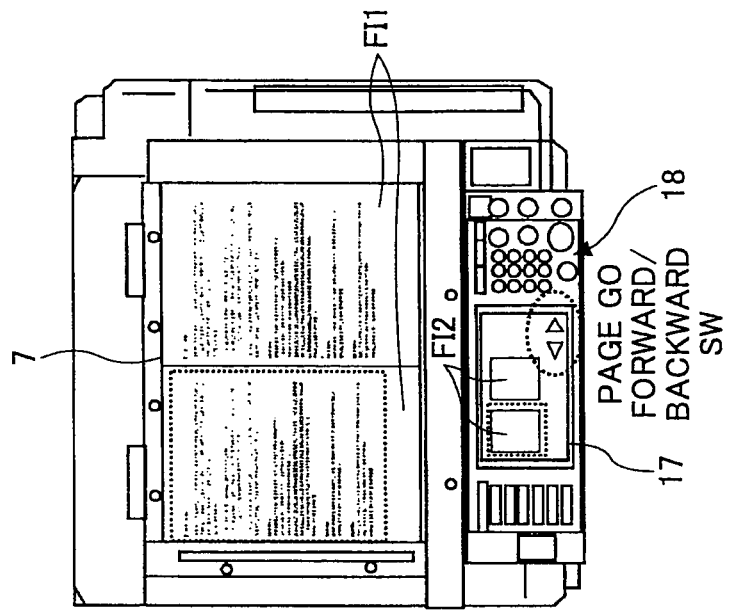
FIGS. 15A, 15B, 15C and 15D show one example of a preview display function of displaying onto the contact glass 7 and one example of a preview display function of displaying onto a display part 17 of the image forming apparatus according to a first variant embodiment of the present invention.

In FIG. 15A, plural sets of image data TN1 stored by the storage part 22 are displayed in a form of respective thumbnails. In the example shown in FIGS. 15A, 15 images TN1 are displayed in the form the respective thumbnails in a state of being reduced in size.

Here, for example, in a case where several sheets or tens of sheets of originals are read by the image reading apparatus 2 after being fed from the ADF 1, the plural sets of image data corresponding to the number of the originals are stored in the storage part 22 through one reading operation of the image reading apparatus 2. If the plural sets of image data are displayed one by one, a considerable time may be required and required operations may be complicated.

Therefore, by displaying the respective sets of image data in the form of the thumbnails in the state in which the respective images TN1 are reduced in size in such a degree that the user can recognize the respective images TN1, the user can check the plural images within a short time period, through easy operation. It is preferable that the user can appropriately select the desired size and number of the respective images TN1 displayed on the contact glass 7 as shown in FIG. 15A so that the desired number of images are displayed in desired size in the form of thumbnails. It is noted that the displaying on the contact glass 7 may be carried out in the method described above with reference to FIGS. 3 through 14 by using the projector part 15. Further, also displaying on the contact glass 7 which will be described with reference to FIGS. 15B through 20B may be carried out also in the method described above with reference to FIGS. 3 through 14 by using the projector part 15.

At the time the displaying is carried out on the contact glass 7 as shown in FIG. 15A, also the display part 17 displays the plural images TN2 in a form of thumbnails in the same way as that on the contact glass 7. However, although the contact glass 7 has a size of, for example, the order of A3 size, the display area of the display part 17 is smaller. Therefore, the displaying on the display part 17 may be such that the user cannot sufficiently recognize the respective images TN2 in the form of thumbnails which are further reduced in size since the display area of the display part 17 is smaller.

The display part 17 has a touch panel function, and the user can operate it by touching the display part 17 to input a command. As shown in FIG. 15A, "page go forward/backward switches" SW are provided on the display part 17, and with the page go forward/backward switches SW, the user can designate one or plural images from among the plural images displayed in the form of thumbnails. Alternatively, by directly touching (or double-clicking) the plural images displayed on the display part 17 in the form of thumbnails, the user can designate one or plural images from among the plural images displayed in the form of thumbnails.

By using the touch panel function of the display part 17, also it is possible, in "selected image displaying" described later with reference to FIG. 15C, to select and designate images to be displayed, set the order of displaying the images or the order of outputting the images for printing the image, and designate images to be deleted.

It is noted that in the embodiment and in the first variant embodiment of the present invention, the display part 17 has the touch panel function, and has some functions of the input part 18. However, the display part 17 is not limited to this configuration in which the display part 17 has only some functions of the input part 18. The display part 17 may have all the functions of the input part 18.

Further, the thumbnails displayed on the contact glass 7 may be printed as they are on recording paper. Thereby, the user can check the plural images on the recording paper.

Further, in the state of displaying the images in the form of thumbnails on the contact glass 7, image processing may be carried out on the respective images. Details of the image processing will be described later.

Full Size Displaying

Figure 15B:
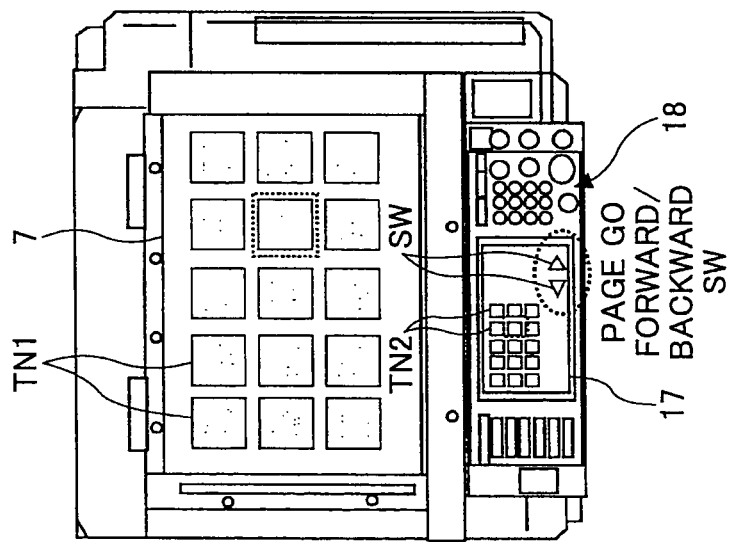

In FIG. 15B, the image information stored in the storage part 22 is displayed in full size (i.e., in size the same as the size of the image to be printed) on the contact glass 7.

In the example shown in FIG. 15B, the images (two images in this example) FI1 are displayed in full size, and therefore, the user can check the images to be actually output (printed). Also in the displaying the images FI1 in full size, the display part 17 displays the images FI2 in a state of being reduced in size from full size, and the user can designate the images by using the touch panel function of the display part 17 the same as the above-mentioned case of "thumbnails displaying". Further, the images displayed in full size on the contact glass 7 can be printed onto recording paper as they are, and thus, the user can check the full-size images also on the recording paper. Further, in the state of displaying the images in full size, image processing may be carried out on the images.

Thus, by displaying images in full size, it is possible to obtain images that are close to the user's images.

Selected Image Displaying

Figure 15D:
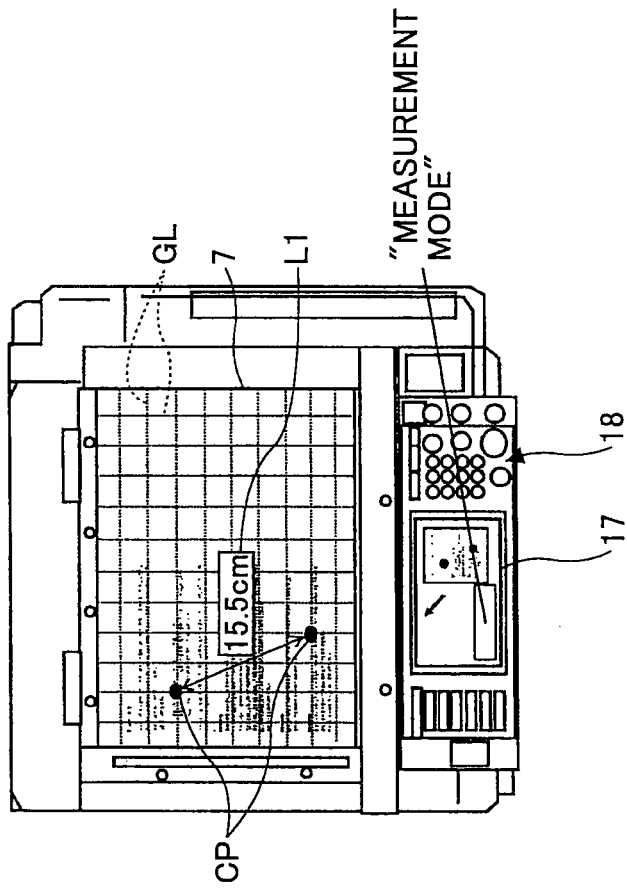
Figure 15C:
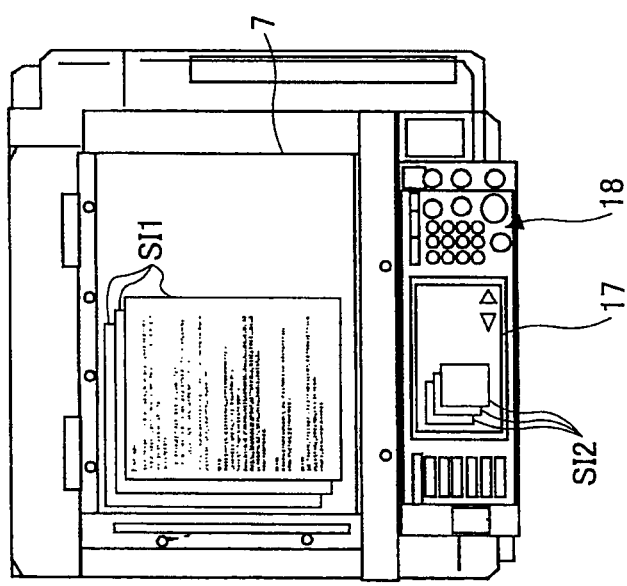

In FIG. 15C, the images selected from FIG. 15A or 15B are displayed on the contact glass 7. In the example of FIG. 15C, the three selected images SI1 are displayed, and the user can print and/or carry out image processing on the selected images SI1. Also in the selected image displaying, the display part 17 displays the images SI2 in a state of being reduced in size from full size, and the same as the case of the thumbnail displaying, the user can input commands (i.e., input commands for printing, carrying out image processing and so forth) by using the touch panel function of the display part 17. The image processing will be described later.

Grid Displaying

In FIG. 15D, in addition to the image data stored in the storage part 22, image information that semitransparent grid lines GL in a form of a lattice which are not actually printed are superposed on the image data is displayed on both the contact glass 7 and the display part 17. It is noted that for the sake of convenience, in FIG. 15D, indication of the semitransparent grid lines GS on the display part 17 is omitted.

By displaying the semitransparent grid lines GL in the form of the lattice, the user can easily determine whether the original has been inclined when being scanned.

Further, as shown in FIG. 15D, the user can display on the contact glass 7 a length L1 (in full scale) by designating two points such as intersections CP of the grids. It is noted that in the full size displaying, it is possible to measure the length by actually using a ruler or such. Further, as shown in FIG. 15D, character information "MEASUREMENT MODE" is displayed on the display part 17 for the user's convenience.

<Combining Images Displayed on Contact Glass 7 (Combining Material Images)>

FIGS. 16A, 16B, 16C, 16D and 16E illustrate an example of combining material images displayed on the contact glass 7 in "preview displaying".

Figure 16C:
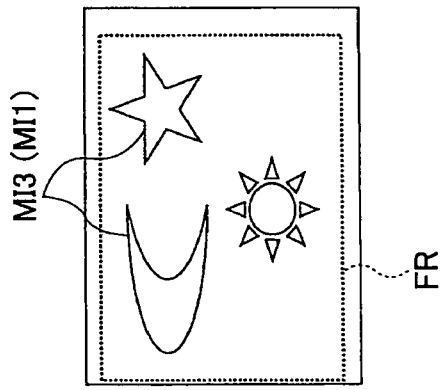
FIGS. 16A, 16B, 16C, 16D and 16E show an example of a process of combining material images displayed by the preview display function.
Figure 16B:
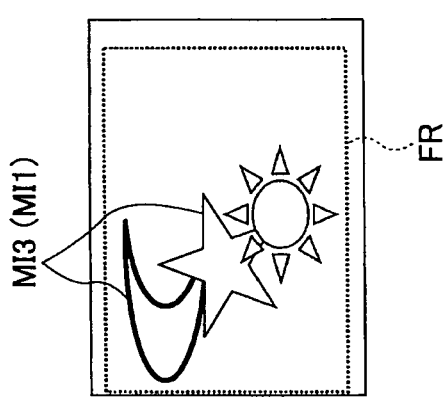
Figure 16A:
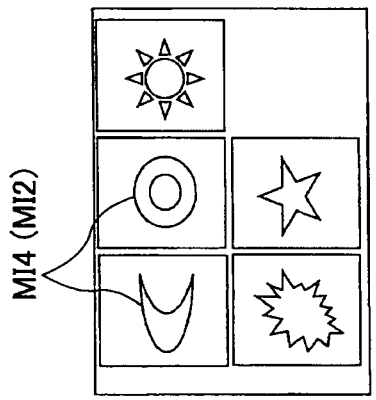

FIG. 16A shows an example in which images MI4 as material images are displayed on the display part 17 in a form of thumbnails. It is noted that FIG. 16A may correspond to a part of the display part 17 as shown in FIG. 16D. In the example of FIG. 16A, five images MI4 as the material images are displayed in the form of thumbnails, and these material images are those having been previously scanned by using the ADF 1 or such, and having been stored in the storage part 22. Further, from the display part 17, the user can select from the five images MI4 displayed in a form of thumbnails by using the touch panel function of the display part 17.

At this time, it is preferable that also on the contact glass 7, the images as the material images are displayed in the form of thumbnails (MI2 in FIG. 16A). At this time, it is preferable that the images as the thumbnails displayed on the contact glass 7 are those magnified from the images MI4 as the thumbnails displayed on the display part 17.

Next, the user selects a "memory combination mode" from the operation part 3, selects images from among the material images displayed on the display part 17 in the form of thumbnails, and combines the material images.

FIG. 16B shows an example in which three images MI3, selected from among the material images MI4 from the display part 17, are displayed as having been reduced in size on the display part 17. It is noted that FIG. 16B may correspond to a part of the display part 17. Further, from the display part 17, image processing can be carried out on the three selected images MI3 through the user's operation by using the touch panel function of the display part 17.

At this time, also on the contact glass 7, the three selected images, displayed on the display part 17, are displayed in full size. Thus, on the contact glass 7, the first image displaying is updated by the state of FIG. 16B from the state of FIG. 16A.

In the example of FIG. 16B, an arrangement of the material images has not been determined yet. By using the touch panel function of the display part 17, the user carries out image processing such as moving the images to dispose the images appropriately and thus obtains a desired combined image. It is noted that a frame FR and a frame FR0 indicated by broken lines in FIGS. 16B and 16D, respectively, correspond to an A3 size to be output (printed), and represent a printing area to be printed.

The user may select any one of the three images MI3 by using the touch panel function of the display part 17, carries out image processing such as moving on the respective images MI3, and obtains the desired combined image. At this time, on the display part 17, it is preferable that, at the time of image processing, the currently selected image is displayed in such a manner that which one of the images is currently selected can be recognized.

It is preferable that the image data thus selected to carry out image processing (A) is displayed in an area different from an area in which the "second image displaying" is carried out, and the image processing operation is set from the different area, or (B) is displayed in the area in which the "second image displaying" is carried out, but is displayed in such a manner that, as shown in FIG. 16B, brightness of the displaying or a color of the displaying is different from that of the "second image displaying", and the image processing operation is set from the area in which the "second image displaying" is carried out. It is noted that, for the purpose of convenience, in FIG. 16B, only the image located at the top left is drawn by bold lines to show the above-mentioned state that brightness of the displaying or a color of the displaying is different from that of (the other two images included in) the "second image displaying".

FIG. 16C shows an example in which the three selected images (combined image) thus processed from the display part 17 are displayed as having been reduced in size. It is noted that FIG. 16C may correspond to a part of the display part 17. That is, from the state of FIG. 16B, image processing such as moving has been carried out, and thus, the desired combined image have been obtained from the three selected images. Further, also on the contact glass 7, the three selected images (combined image), displayed on the display part 17 as having been reduced in size, are displayed in full size.

FIG. 16D shows an example of the material images MI4 and the combined image MI3 displayed on the display part 17 as having been reduced in size, and an example of user interface information "REDUCE IN SIZE/MAGNIFY" and "MOVE". The method of displaying is not limited to the example shown in FIG. 16D. However, in the example of FIG. 16D, the material images MI4 are displayed in the form of thumbnails at the top left of the display part 17, the selected images or the combined image obtained from the image processing being carried out on the selected images are displayed at the top right of the display part 17, and the user interface information is displayed at the bottom of the display part 17. Therefore, by using the touch panel function of the display part 17, selection of the images, the image processing operations, and so forth, can be easily carried out.

By using the user interface information including a menu as "REDUCE IN SIZE/MAGNIFY" and "MOVE" as shown in FIG. 16D, it is possible to appropriately select from the various image processing operations (i.e., the various image operation modes) from the menu. As the image processing operations, for example, a "cut out" mode, a "rotation" mode, a "move" mode, a "reduce in size" mode, a "magnify" mode, a "text input" mode and so fourth may be applied. Otherwise, the user interface information may show to the user information that may assist the user in creating the combined image, such as a specific procedure of the image processing.

Figure 16E:
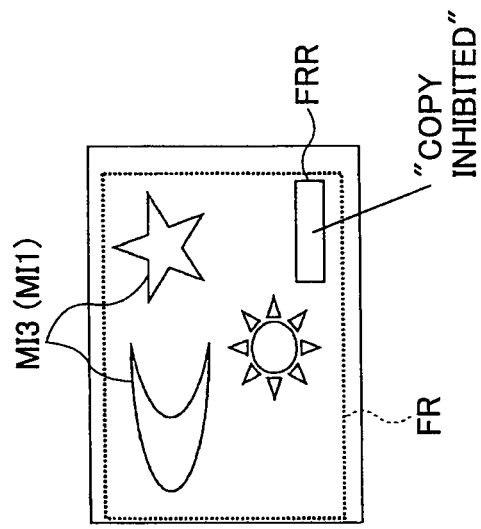
Figure 16D:
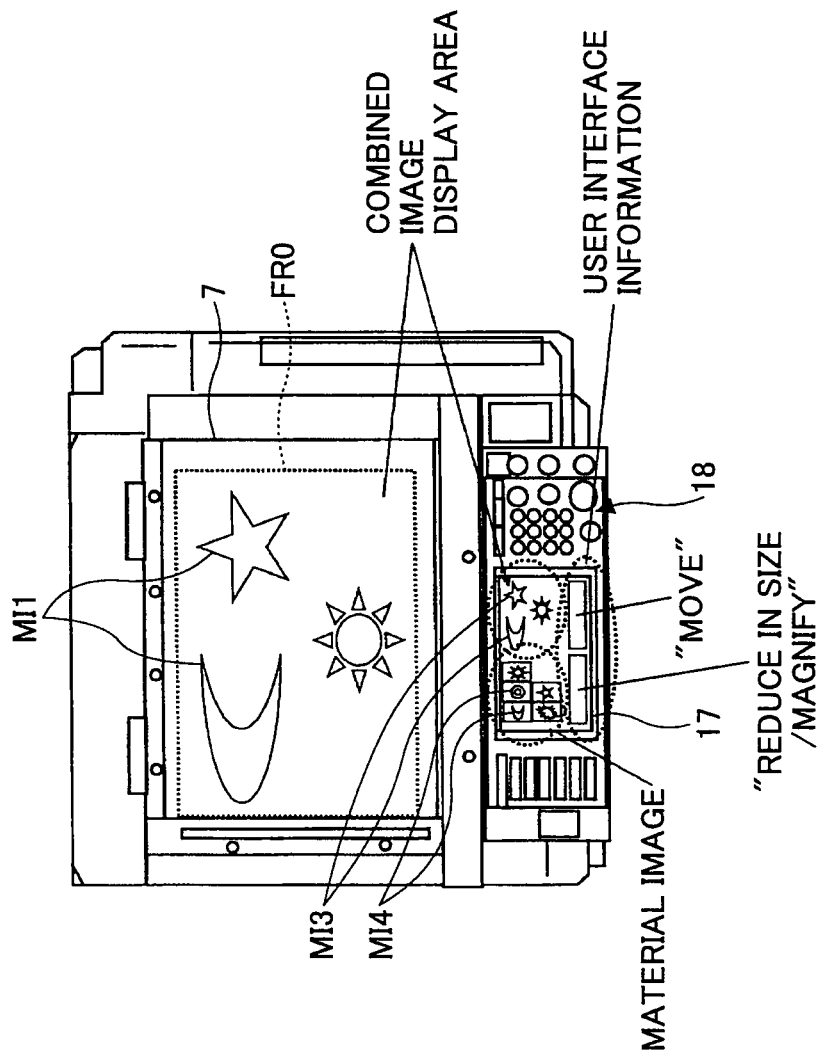

FIG. 16E shows an example in which an image in which further a text message "COPY INHIBITED" is combined is displayed on the display part 17. It is noted that FIG. 16E may correspond to a part of the display part 17. At this time, also on the contact glass 7, the image displayed on the display part 17 is displayed in full size.

It is possible to thus add text to the combined image by inputting the text by using the user interface. Specifically, inputting text may be carried out in an input method in which input keys are displayed on the display part 17, and the touch panel function is used to input the text, or another input method in which a ten key provided in the outside of the display part 17 (for example, a ten key provided in the input part 18) is used, and a text is input in a method widely used as text input method of a cellular phone.

For the input text, further a font, a character size, a frame or closing line enclosing the text, or such, may be set.

Then, the text "COPY INHIBITED" modified as shown in FIG. 16E with the frame FRR is disposed at a position shown, and thus, the combined image including the modified text is obtained.

It is noted that fixed characters, a fixed sentence, a mark or such may be previously registered in the storage part 22, and the user may create and register material images as a default in the storage part 22.

The combined image thus obtained is displayed on the contact glass 7 in full size, and after the user confirms the displayed combined image, the user presses a printing button provided in the input part 18, and the image forming part 5 prints the combined image.

<Combining Images Displayed on Contact Glass 7 (Combining with Additional Original)>

FIGS. 17A, 17B, 17C, 17D, 17E and 17F illustrate an example in which an image having already been scanned and displayed on the contact glass 7 and additional originals are combined in the image reading apparatus 2 according to the first variant embodiment.

Figure 17A:
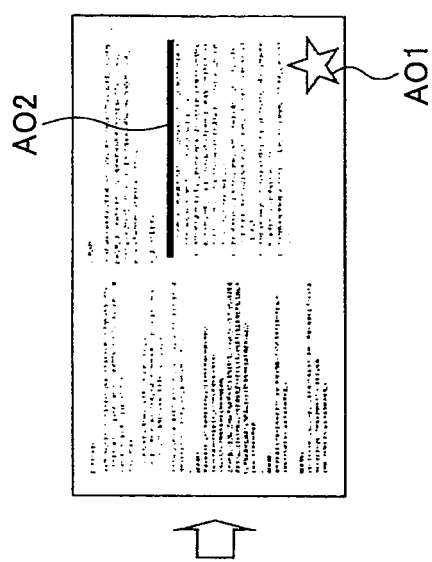
Figure 17B:
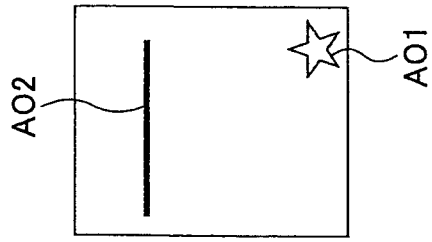
Figure 17C:
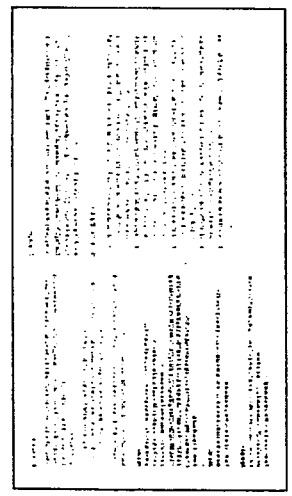

FIG. 17A shows an example of the already scanned image, and FIG. 17B shows examples of images AO1 and AO2 of the respective additional originals. Further, FIG. 17C shows a combined image obtained from the already scanned image shown in FIG. 17A and the images AO1 and AO2 of the additional originals shown in FIG. 17B being combined.

Specific procedures of the combining will now be described in detail.

When a "direct combination mode" is selected from the operation part 3, an image having been scanned and stored in the storage part 22 is displayed on the contact glass 7 in full size in a state of being turned over (i.e., the face being reversed) (see FIG. 17D).

Next, an area of the thus-displayed image to which the image of the additional original is to be combined is designated through the user's operation from the display part 17, for example, using the touch panel function. For example, as shown in FIG. 17D, frames FR1 and FR2 of broken lines are displayed on both the contact glass 7 and the display part 17 in the same way to represent the area in which the image of the additional original is to be combined (added).

Then, in the state in which the area FR1 to combine the image of the additional original is displayed as shown in FIG. 17D, the additional original OR1 having the image AO1 is disposed onto the contact glass 17 in a state of being reversed (see FIG. 17E). At this time, it is preferable that brightness of the contact glass 7 is increased, or the transmittance of the contact glass is increased so that the face of the additional original OR1 can be easily seen through the paper. After that, as shown in FIG. 17E, the user adjusts the position of the additional original OR1 with respect to the area FR1 displayed on the contact glass 7 so that the image AO1 (i.e., of a star shape) of the additional original OR1, which can be seen through the paper, is within the area FR1 in which the image of the additional original is to be combined.

After thus disposing the additional original OR1 on the contact glass 7, the user closes the scanner cover 25, and operates the image reading apparatus 2 to scan the image AO1 of the additional original OR1.

Through the above-described operations, the image AO1 of the star shape, which is a part of the images AO1 and AO2 shown in FIG. 17B, is combined with the image shown in FIG. 17A, and the thus-obtained combined image is displayed on the contact glass 7 in full size, and also, is displayed on the display part 17 as having been reduced in size.

Further, the black horizontal line AO2 (see FIG. 17B) is combined, in the same procedure as that when the star shape AO1 has been combined, by using the other additional original having the image AO2. Thus, the combined image shown in FIG. 17C is obtained. Similarly, the combined image is displayed on the contact glass in full size, and also, is displayed on the display part 17 as having been reduced in size (see FIG. 17F).

The thus-obtained combined image is displayed on the contact glass 7 in full size as mentioned above. Then, after the user confirms the displayed combined image, the user presses the printing button, and the image forming part 5 prints the combined image.

It is noted that such combining is not limited to the method in which the image processing is carried out on the images scanned and stored in the storage part 22 in full size. Instead, the images of the additional originals may be combined in the direct combination mode after image processing such as magnifying/reducing in size, rotation, or such is carried out on the images scanned and stored in the storage part 22.

<Image Editing Process of Image Displayed on Contact Glass 7 (Cut Out Mode)>

Cut-Out Mode

Figure 18A:
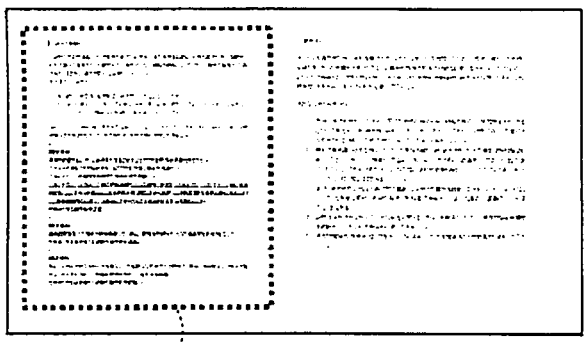
FIGS. 18A and 18B illustrate image processing (i.e., a cut-out process) on a preview image displayed on the contact glass 7 in the image reading apparatus according to the first variant embodiment of the present invention.
Figure 18B:
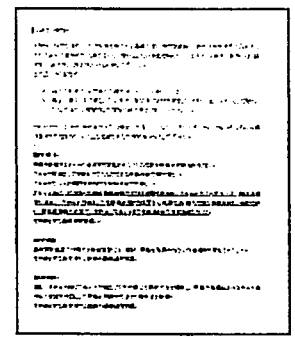

FIGS. 18A and 18B show an example of image processing (cut-out process) of a preview image displayed on the contact glass 7 in the image reading apparatus 2 according to the first variant embodiment of the present invention.

FIG. 18A shows an example of an image displayed on the contact glass 7 in "preview displaying". FIG. 18B shows a part of the image displayed on the contact glass 7 in preview displaying shown in FIG. 18A, and the part corresponds to an area the user needs.

First, on the contact glass 7, the image scanned and stored in the storage part 22 is displayed in full size as shown in FIG. 18A.

Next, the user selects the "cut-out mode" from the operation panel 3, and designates the area the user needs, for example, by using the touch panel function of the display part 17, the same as the above-mentioned case of designating the area FR1 described with reference to FIG. 17D. The area the user needs is the area enclosed by the frame FR11 indicated by broken lines in FIG. 18A, and is of A4 size. It is noted that the image displayed on the contact glass 7 in the preview displaying as shown in FIG. 18A corresponds to A3 size.

Thus, the area of the frame FR11 is then cut out, and the cut out image shown in FIG. 18B is displayed on the contact glass 7 in full size. Then, after the user confirms the displayed cut out image, the user presses the printing button, and the image forming part 5 prints the cut out image.

<Image Editing Process of Image Displayed on Contact Glass 7 (Rotation Mode)>

Rotation Mode

Figure 19A:
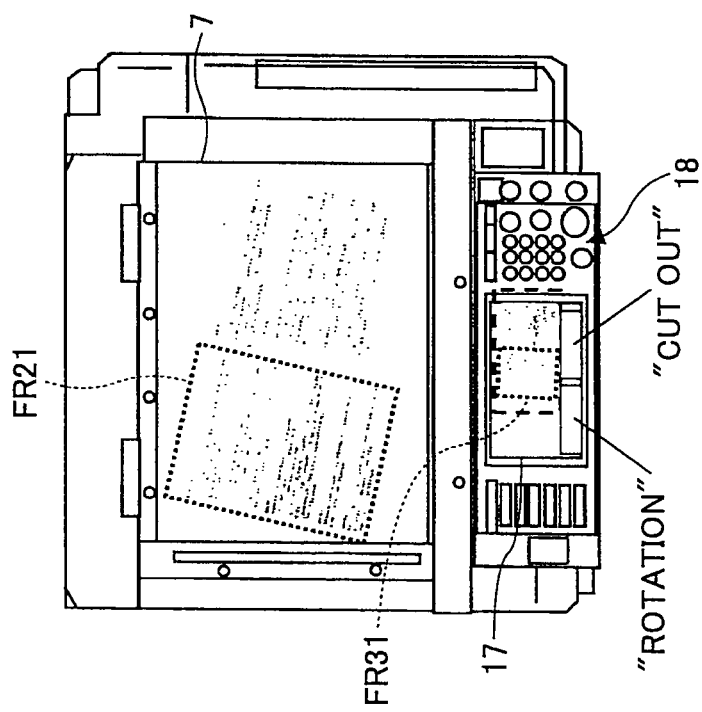
FIGS. 19A and 19B illustrate image processing (i.e., a rotation process) on a preview image displayed on the contact glass 7 in the image reading apparatus according to the first variant embodiment of the present invention.
Figure 19B:
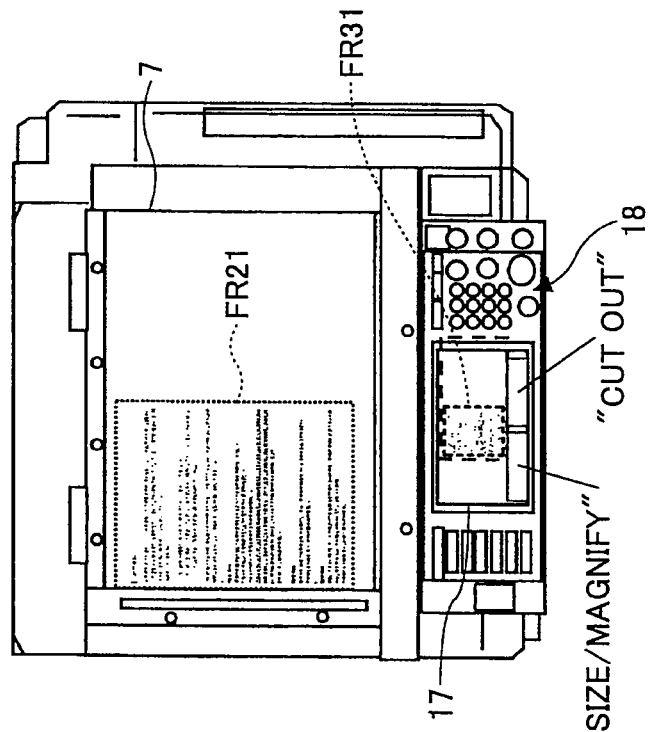

FIGS. 19A and 19B show an example of image processing (rotation process) of a preview image displayed on the contact glass 7 in the image reading apparatus 2 according to the first variant embodiment of the present invention.

FIG. 19A shows one example of the image in preview displaying, and FIG. 19B shows an example obtained from a part of the image in preview displaying shown in FIG. 19A being rotated.

First, on the contact glass 7, the image scanned and stored in the storage part 22 is displayed in full size as shown in FIG. 19A.

In the example shown in FIG. 19A, because the original has been scanned obliquely, the image is displayed on the contact glass 7 and on the display part 17 in a state of becoming oblique from the desired state, as shown in FIG. 19A.

Next, the user selects a "rotation mode" from the operation panel 3, and designates the area the user needs, for example, by using the touch panel function of the display part 17, the same as the above-mentioned case of designating the area FR1 described with reference to FIG. 17D. The area the user needs is the area enclosed by the frame FR21 (in the first image displaying) and the frame FR31 (in the second image displaying) indicated by broken lines in FIG. 19A. The area the user needs may be designated freely in size or may be designated by designating a predetermined size such as A4 size. As shown in FIG. 19A, the area designated by the frames FR21 and FR21 of the broken lines is displayed. That is, the area from which printing is carried out is displayed. After that, the user appropriately rotates the designated area FR21 or FR31, for example, by appropriately operating the operation panel 3. Thus, it is possible to obtain the desired rotated image as shown in FIG. 19B.

The thus-obtained rotated image is displayed on the contact glass 7 in full size, and also, is displayed on the display part 17 in the reduced size, as shown in FIG. 19B. Then, after the user confirms the displayed rotated image, the user presses the printing button, and the image forming part 5 prints the rotated image.

Figure 20B:
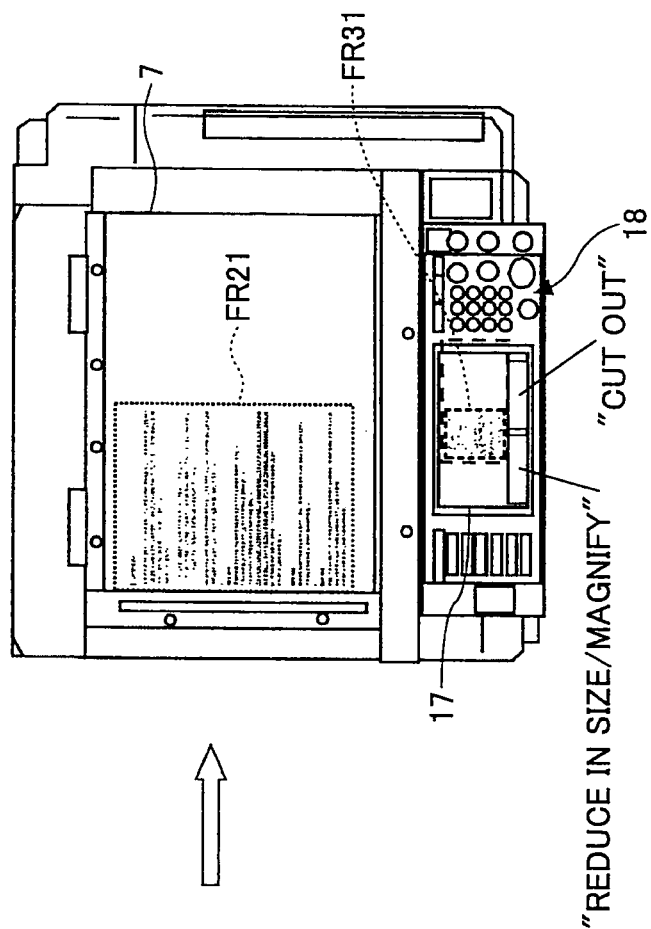
FIGS. 20A and 20B illustrate another example of image processing (i.e., a rotation process) on a preview image displayed on the contact glass 7 in the image reading apparatus according to the first variant embodiment of the present invention.
Figure 20A:
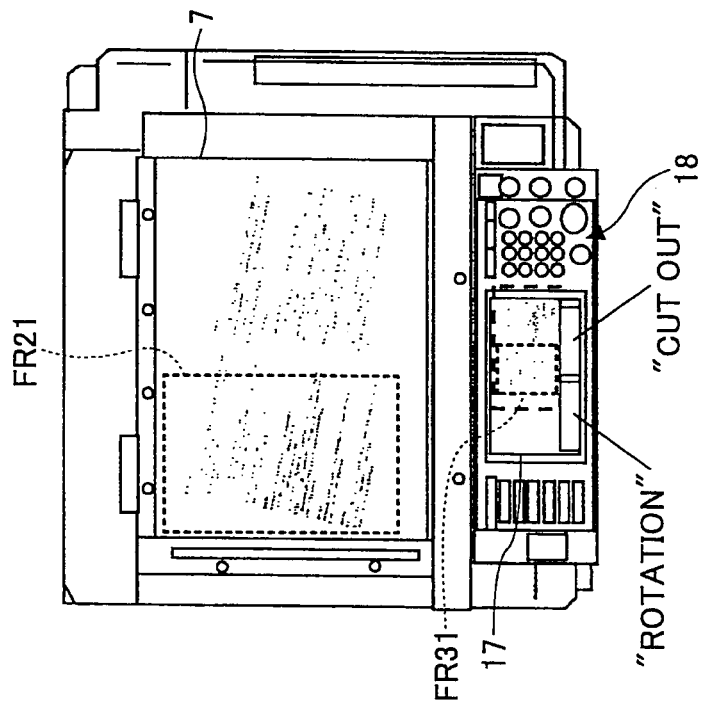

It is noted that in the above-mentioned example, the area designated (defined) by the frame FR21 or FR31 of the broken lines is rotated, and the desired rotated image is obtained. However, the rotation mode is not limited to this method. Instead, as shown in FIGS. 20A and 20B, the frame FR21 or FR31 (indicating the area corresponding to the printing area) may be fixed, and the image displayed in preview displaying (or a part thereof) may be rotated, and may be moved into the frame FR21 or FR31 of the broken lines. Further, image processing to be carried out on the designated area or the image displayed in preview displaying is not limited to rotation (changing the inclination), and image processing of one or more appropriately selected from moving the position, changing the size (i.e., magnifying/reducing in size) and so forth may be carried out on the designated area or the image displayed in preview displaying.

Further, the setting of the image processing operation such as the reducing in size, magnifying, rotation and cutting out is reflected on both the first image displaying on the contact glass 7 and the second image displaying on the display part 17. For example, as shown in FIGS. 19A and 19B, the setting of rotation of the image as the image processing operation is reflected on both the first image displaying on the contact glass 7 and the second image displaying on the display part 17. That is, as shown in FIG. 19B, in both the contact glass 7 and the display part 17, the images defined by the designated areas FR21 and FR31 have been rotated from the state of FIG. 19A, respectively.

Figure 21:
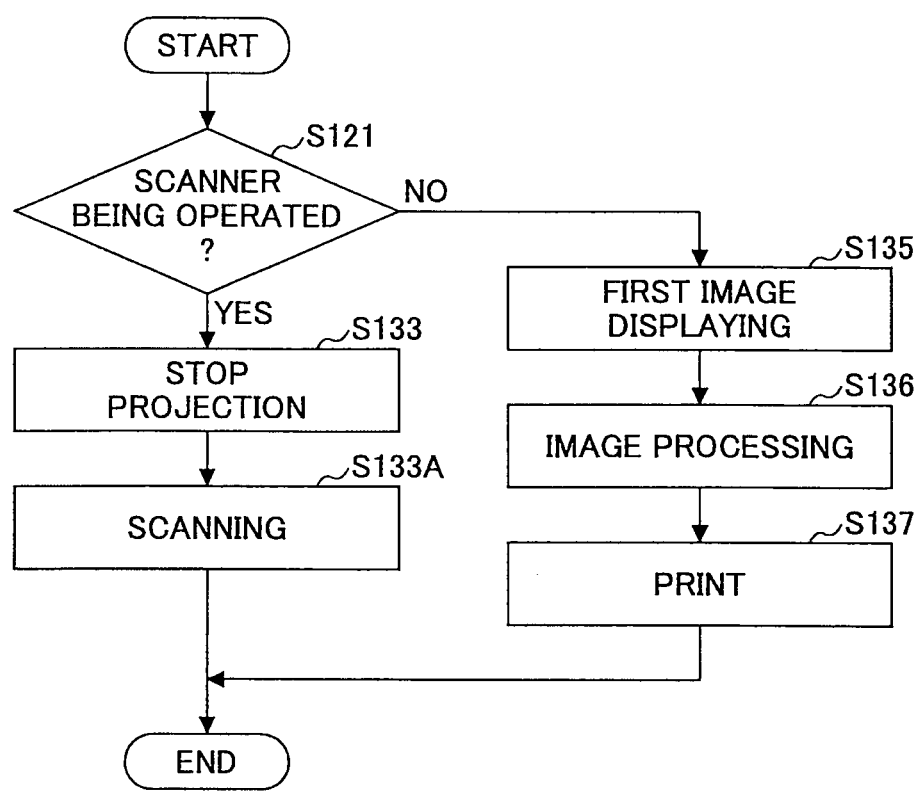
FIG. 21 shows a flowchart illustrating a control procedure according to the first variant embodiment of the present invention.

Next, with reference to FIG. 21, a control procedure of the first variant embodiment of the present invention will be described.

In step S121, the scanner control part 14 determines whether the scanner part is being operated, i.e., whether the user has given an input from the operation panel 3 to start scanning. The scanner control part 14 controls the voltage applied to the contact glass 7 to increase the transmittance of the contact glass 7 and the projector part 15 stops projecting the image information onto the contact glass 7 if any (step S133), at the time that the scanner part is being operated (step S121 "YES"). Then, in step S133A, the scanner part starts scanning and reading the original placed on the contact glass 7, the same as step S1e of FIG. 12 or step S2a of FIG. 14.

On the other hand, the scanner control part 14 controls the voltage applied to the contact glass 7 to decrease the transmittance of the contact glass 7 and the projector part 15 carries out the first image displaying of projecting the image data stored in the storage part 22 as the image information onto the contact glass 7 (step S135), at the time that the scanner part is not being operated (step S121 "NO").

Then, if necessary, the image processing (such as that described above with reference to FIGS. 15A through 20B) is carried out (step S136) according to the user's instruction. After that, according to the user's instruction (i.e., pressing the printing button), the image forming part 5 prints the image information stored in the storing part 22 (step S137).

Figure 22:
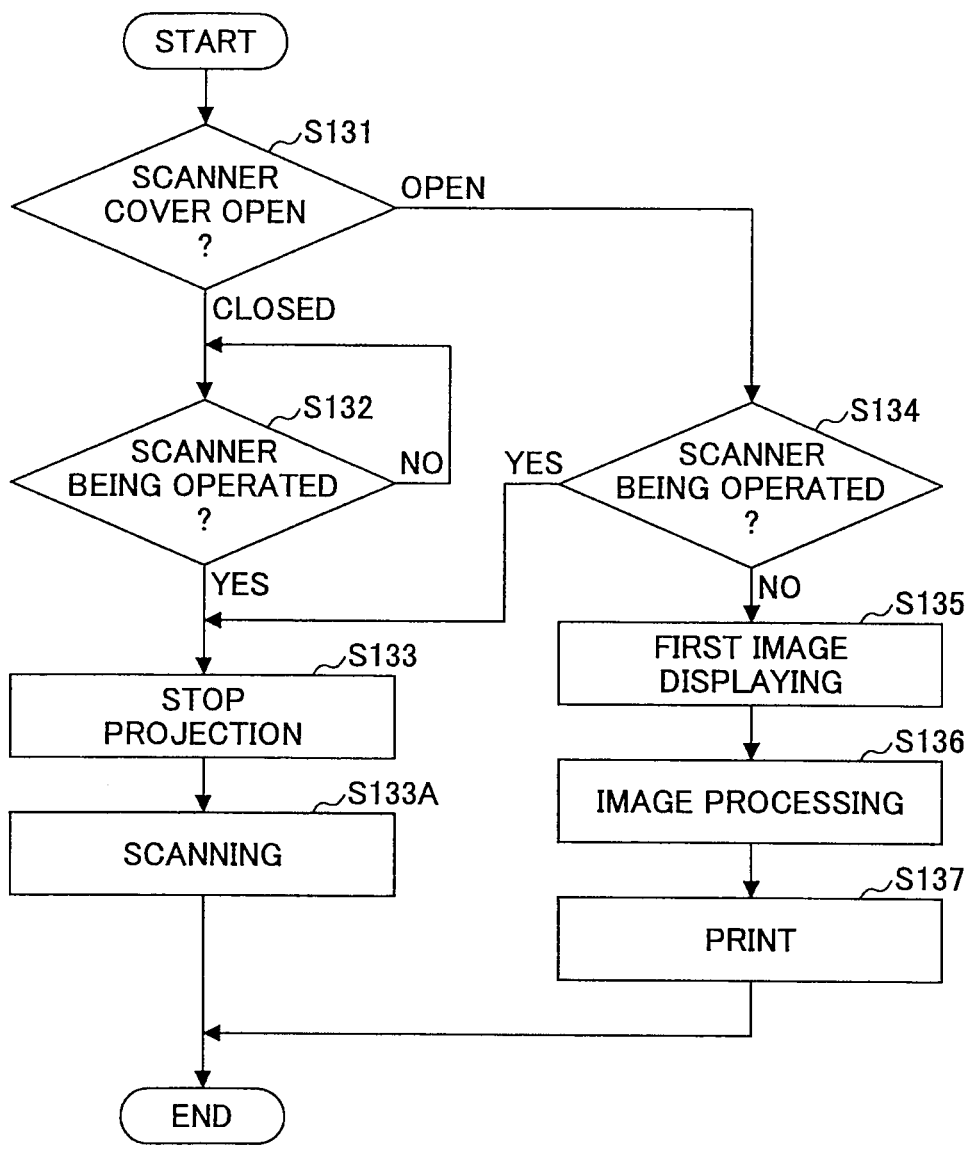
FIG. 22 shows a flowchart illustrating a control procedure according to a second variant embodiment of the present invention.

Next, with reference to FIG. 22, a control procedure of a second variant embodiment of the present invention will be described.

An image reading apparatus according to the second variant embodiment and an image forming apparatus according to the second variant embodiment including the image reading apparatus according to the second variant embodiment are approximately the same as the image reading apparatus and the image forming apparatus according to the first variant embodiment described above with reference to FIGS. 1A through 21, respectively. Therefore, duplicate description is omitted and mainly different points will now be described.

In step S131, the scanner control part 14 determines whether the scanner cover open sensor 16 has detected that the scanner cover 25 is in the closed state. When the scanner cover open sensor 16 has detected that the scanner cover 25 is in the closed state (step S131 "CLOSED"), the scanner control part 14 then determines whether the scanner part is being operated (step S132), i.e., whether the user has given an input from the operation panel 3 to start scanning. The scanner control part 14 controls the voltage applied to the contact glass 7 to increase the transmittance of the contact glass 7 and the projector part 15 stops projecting the image information onto the contact glass 7 if any (step S133), at the time that the scanner part is being operated (step S132 "YES"). Then, in step S133A, the scanner part starts scanning and reading the original placed on the contact glass 7, the same as step S1e of FIG. 12 or step S2a of FIG. 14.

On the other hand, when the scanner cover open sensor 16 has detected that the scanner cover 25 is in the open state (step S131 "OPEN"), the scanner control part 14 then determines whether the scanner part is being operated (step S134). The scanner control part 14 controls the voltage applied to the contact glass 7 to decrease the transmittance of the contact glass 7 and the projector part 15 carries out the first image displaying of projecting the image data stored in the storage part 22 as the image information onto the contact glass 7 (step S135), at the time that the scanner part is not being operated (step S134 "NO").

Then, if necessary, the image processing (such as that described above with reference to FIGS. 15A through 20B) is carried out (step S136) according to the user's instruction. After that, according to the user's instruction (i.e., pressing the printing button), the image forming part 5 prints the image information stored in the storing part 22 (step S137).

On the other hand, when the scanner part is being operated (step S134 YES), the scanner control part 14 controls the voltage applied to the contact glass 7 to increase the transmittance of the contact glass 7 and the projector part 15 stops projecting the image information onto the contact glass 7 if any (step S133). Then, in step S133A, the scanner part starts scanning and reading the original placed on the contact glass 7, the same as step S1e of FIG. 12 or step S2a of FIG. 14.

Figure 23:
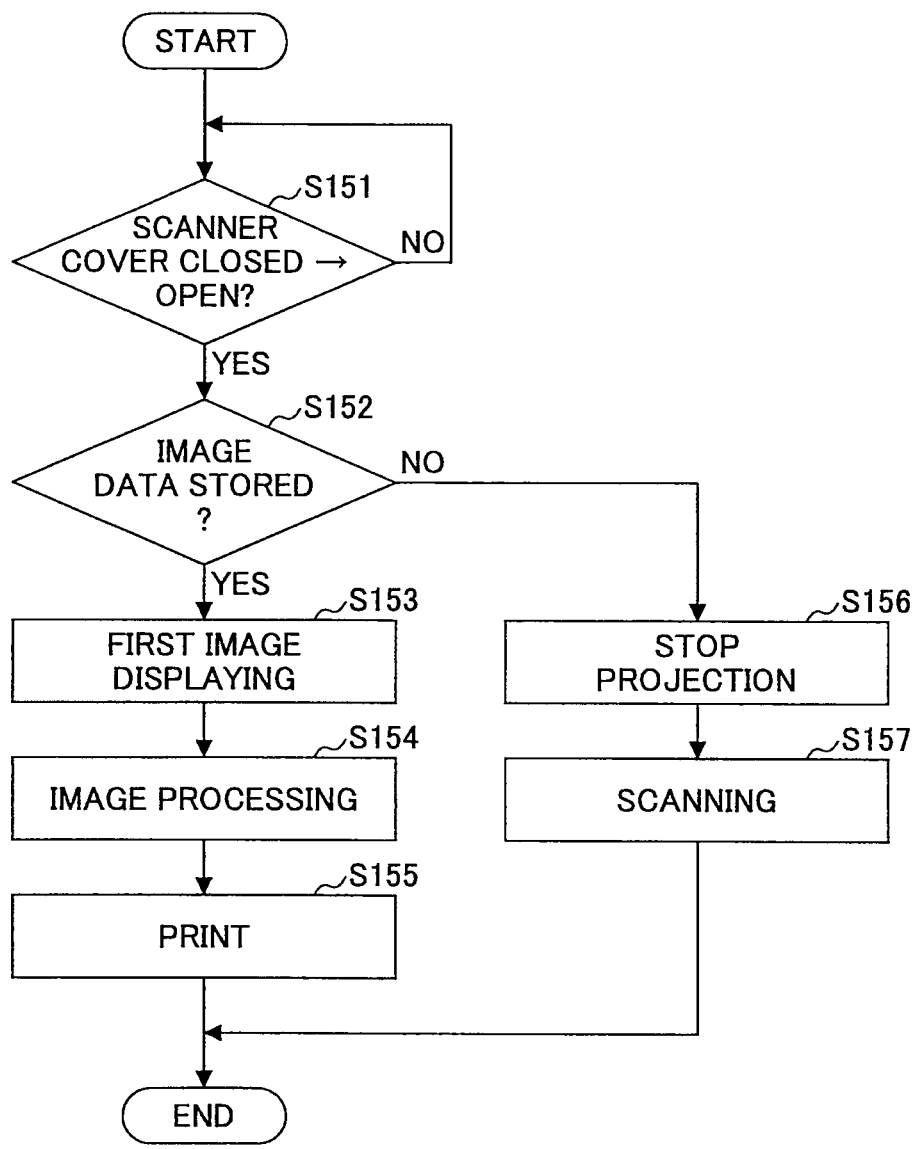
FIG. 23 shows a flowchart illustrating a control procedure according to a third variant embodiment of the present invention.

Next, with reference to FIG. 23, a control procedure of a third variant embodiment of the present invention will be described.

An image reading apparatus according to the third variant embodiment and an image forming apparatus according to the third variant embodiment including the image reading apparatus according to the third variant embodiment are approximately the same as the image reading apparatus and the image forming apparatus according to the second variant embodiment described above with reference to FIGS. 1A through 22, respectively. Therefore, duplicate description is omitted and mainly different points will now be described.

In step S151, the scanner control part 14 determines from the detection signal provided by the scanner cover open sensor 16, whether the state of the scanner cover 25 has been changed from the closed state to the open state. Then, when the scanner control part 14 has determined that the state of the scanner cover 25 has been changed from the closed state to the open state (S151 YES), the scanner control part 14 determines whether image data has been stored in the storage part 22 (step S152). Then, when the scanner control part 14 has determined that image data has been stored in the storage part 22 (step S152 YES), the scanner control part 14 controls the voltage applied to the contact glass 7 to decrease the transmittance of the contact glass 7 and the projector part 15 carries out the first image displaying of projecting the image data stored in the storage part 22 as the image information onto the contact glass 7 (step S153).

Then, if necessary, the image processing (such as that described above with reference to FIGS. 15A through 20B) is carried out (step S154) according to the user's instruction. After that, according to the user's instruction (i.e., pressing the printing button), the image forming part 5 prints the image information stored in the storing part 22 (step S155).

On the other hand, when no image data has been stored in the storage part 22 (step S152 NO), the scanner control part 14 controls the voltage applied to the contact glass 7 to increase the transmittance of the contact glass 7 and the projector part 15 stops projecting the image information onto the contact glass 7 (step S156). Then, in response to the user's instruction to scan the original placed on the contact glass 7, the scanner part starts scanning and reading the original, the same as steps S1d and S1e of FIG. 12 or steps S29 and S2a of FIG. 14 (step S157).

The present invention is not limited to the specifically disclosed embodiments, and variations and modifications may be made without departing from the scope of the present invention.

The present application is based on Japanese Priority Application No. 2010-058763 filed on Mar. 16, 2010, the entire contents of which are hereby incorporated herein by reference.

What is claimed is:

1. An image reading apparatus that reads an image of an original placed on a contact glass and outputs the read image as printing data according to a paper size or a printing magnification which has been set, comprising:
    the contact glass having a light control glass part that has transmittance which is changed according to a state of a voltage being applied, and having one side that acts as an original placement surface;
    a scanner part that reads the original placed on the contact glass and outputs image data of the read original in a storage part;
    a projector part that projects image information onto the contact glass from a side of the contact glass opposite to the original placement surface; and
    a control part that controls the voltage to be applied to the light control glass part, wherein
    at a time of the scanner part being operated, the control part controls the voltage to increase the transmittance of the contact glass, and the projector part stops projecting the image information onto the contact glass, and
    at a time of the scanner part being not operated, the control part controls the voltage to decrease the transmittance of the contact glass, and the projector part carries out first image displaying of projecting the image data stored in the storage part as the image information onto the contact glass.

2. The image reading apparatus as claimed in claim 1, wherein
    the projector part carries out the first image displaying of projecting thumbnails or an image that has been selected to be processed in image processing or be printed, based on the image data stored in the storage part.

3. The image reading apparatus as claimed in claim 2, wherein
    the projector part projects the selected image in an image size in which the selected image is to be printed.

4. The image reading apparatus as claimed in claim 1, further comprising:
    a display part that displays image information; and
    an operation part for setting execution of reading by the scanner part and an image processing operation to be carried out on the image data stored in the storage part, wherein
    the display part carries out second image displaying obtained from the first image displaying being reduced in size, and
    the setting, by the operation part, of the image processing operation to be carried out on the image data stored in the storage part is reflected on the first image displaying and the second image displaying.

5. The image reading apparatus as claimed in claim 4, wherein
    the display part has a touch panel function, and has a part or all of the functions of the operation part.

6. The image reading apparatus as claimed in claim 4, wherein
    the display part displays, in addition to the image information, user interface information concerning an image processing operation to be carried out on the image information.

7. The image reading apparatus as claimed in claim 4, wherein
the projector part carries out the first image displaying of projecting thumbnails based on the image data stored in the storage part, and
the operation part is used to set an image processing operation of at least one of selection of an image to be displayed, designation of an image to be deleted, and setting of an order of outputting the image data, at the time the thumbnails are projected by the projector part.

8. The image reading apparatus as claimed in claim 4, wherein
the image processing operation has at least one mode selected from a reduction mode of reducing an image in size, a magnifying mode of magnifying an image, a rotation mode of rotating an image, a moving mode of moving an image in a direction along a displaying surface, and a cut-out mode of cutting out a part of an image,
the projector part carries out the first image displaying of projecting the image selected to have the image processing operation carried out or be printed based on the image data stored in the storage part, and
the image reading apparatus includes a printing area displaying part that, at the time the selected image is displayed, displays a printing area that indicates an area to be printed on each of the first image displaying and the second image displaying in addition to the selected image displayed based on the image data.

9. The image reading apparatus as claimed in claim 8, wherein
the printing area displaying part displays the printing area in a condition in which one or more of a position, a size and a lean of the printing area is changed, and
a condition of displaying the selected image is fixed.

10. The image reading apparatus as claimed in claim 8, wherein
the printing area displaying part fixes a condition of displaying the printing area, and
the operation part is used to set the image processing operation of changing one or more of a position, a size and a lean of the selected image.

11. The image reading apparatus as claimed in claim 4, further comprising a grid displaying part that displays, at a time of the selected image being displayed, a grid in addition to the selected image throughout the area of the first image displaying and the area of the second image displaying.

12. The image reading apparatus as claimed in claim 1, further comprising:
a scanner cover that covers the contact glass and is able to be opened and closed with respect to the contact glass; and
a detection part that detects whether the scanner cover is open or closed, wherein
when the detection part has detected that the scanner cover is in a closed state, the control part controls the voltage to increase the transmittance of the contact glass and the projector part stops projecting the image information onto the contact glass, at the time of the scanner part being operated, and
when the detection part has detected that the scanner cover is in an open state, the control part controls the voltage to decrease the transmittance of the contact glass and the projector part carries out the first image displaying of projecting the image data stored in the storage part as the image information onto the contact glass, at the time of the scanner part being not operated.

13. The image reading apparatus as claimed in claim 12, wherein
when the detection part has determined from a detection signal provided by the detection part that the state of the scanner cover has been changed from the closed state to the open state,
the control part controls the voltage to decrease the transmittance of the contact glass and the projector part carries out the first image displaying of projecting the image data stored in the storage part as the image information onto the contact glass, when the image data has been stored in the storage part, and
the control part controls the voltage to increase the transmittance of the contact glass and the projector part stops projecting the image information onto the contact glass, when no image data has been stored in the storage part.

14. An image forming apparatus including the image reading apparatus claimed in claim 1.

15. An image reading method of reading an image of an original placed on a contact glass and outputting the read image as printing data according to a paper size or a printing magnification which has been set, comprising:
reading the image of the original placed on the contact glass that has a light control glass part that has transmittance which is changed according to a state of a voltage being applied and has one side that acts as an original placement surface, and outputting image data of the read original to a storage part;
projecting image information onto the contact glass from a side of the contact glass opposite to the original placement surface; and
controlling the voltage to be applied to the light control glass part, wherein
at the time of reading the image of the original, the voltage is controlled to increase the transmittance of the contact glass, and projection of the image information onto the contact glass is stopped, and
at a time of other than reading the image of the original, the voltage is controlled to decrease the transmittance of the contact glass, and first image displaying of projecting the image data stored in the storage part as the image information onto the contact glass is carried out.

16. The image reading method as claimed in claim 15, wherein
the first image displaying is to project thumbnails or an image that has been selected to have an image processing operation carried out or be printed according to the image data stored in the storage part.

17. The image reading method as claimed in claim 16, wherein
the selected image is projected onto the contact glass in an image size in which the selected image is to be printed.

18. The image reading method as claimed in claim 15, further comprising:
displaying image information on a display part; and
setting execution of the reading of the image of the original and an image processing operation to be carried out on the image data stored in the storage part, wherein
the displaying image information on the display part comprises second image displaying on the display obtained from the first image displaying being reduced in size, and
the setting of the image processing operation to be carried out on the image data stored in the storage part is reflected on the first image displaying and the second image displaying.

19. An image forming method comprising the image reading method claimed in claim 15.

* * * * *